United States Patent
Elshafie et al.

(10) Patent No.: US 12,132,324 B2
(45) Date of Patent: Oct. 29, 2024

(54) ENERGY REQUEST AND ENERGY REPORT COMMUNICATIONS FOR ENERGY HARVESTING USER EQUIPMENTS

(71) Applicant: QUALCOMM Incorporated, San Diego, CA (US)

(72) Inventors: Ahmed Elshafie, San Diego, CA (US); Linhai He, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 18/170,172

(22) Filed: Feb. 16, 2023

(65) Prior Publication Data

US 2024/0283290 A1    Aug. 22, 2024

(51) Int. Cl.
*H02J 50/00* (2016.01)
*H02J 50/80* (2016.01)
*H04W 8/22* (2009.01)
*H04W 52/36* (2009.01)

(52) U.S. Cl.
CPC ............ *H02J 50/001* (2020.01); *H02J 50/80* (2016.02); *H04W 8/22* (2013.01); *H04W 52/367* (2013.01)

(58) Field of Classification Search
CPC . H04W 72/23; H04W 52/0216; H04W 24/10; H04W 52/0235; H04W 28/0221; H02J 50/80; H02J 50/001; H02J 50/20
See application file for complete search history.

(56) References Cited

U.S. PATENT DOCUMENTS

| | | | | |
|---|---|---|---|---|
| 2020/0336185 A1* | 10/2020 | Lee | .......................... | H02J 50/90 |
| 2024/0072572 A1* | 2/2024 | Butt | ......................... | H02J 50/80 |
| 2024/0098648 A1* | 3/2024 | Tayyab | .............. | H04W 52/0258 |

FOREIGN PATENT DOCUMENTS

WO    WO-2023052155 A1 *   4/2023

* cited by examiner

*Primary Examiner* — Ryan Johnson
(74) *Attorney, Agent, or Firm* — Dinsmore & Shohl LLP

(57) ABSTRACT

The present disclosure provide techniques for communicating energy request reports and energy reports. A method includes sending an energy request indication in an energy request occasion, the energy request indication indicating a request for a user equipment (UE) to send an energy request report to the network node. The method further includes sending the energy request report, the energy request report indicating a request for a network node to transmit power to the UE or a request for time for the UE to harvest energy. The method further includes sending an energy report indication in an energy report occasion, the energy report indication indicating a request for the UE to send an energy report to the network node. The method further includes sending the energy report, the energy report indicating to the network node at least one communication capability of the UE based on an energy level of the UE.

30 Claims, 14 Drawing Sheets

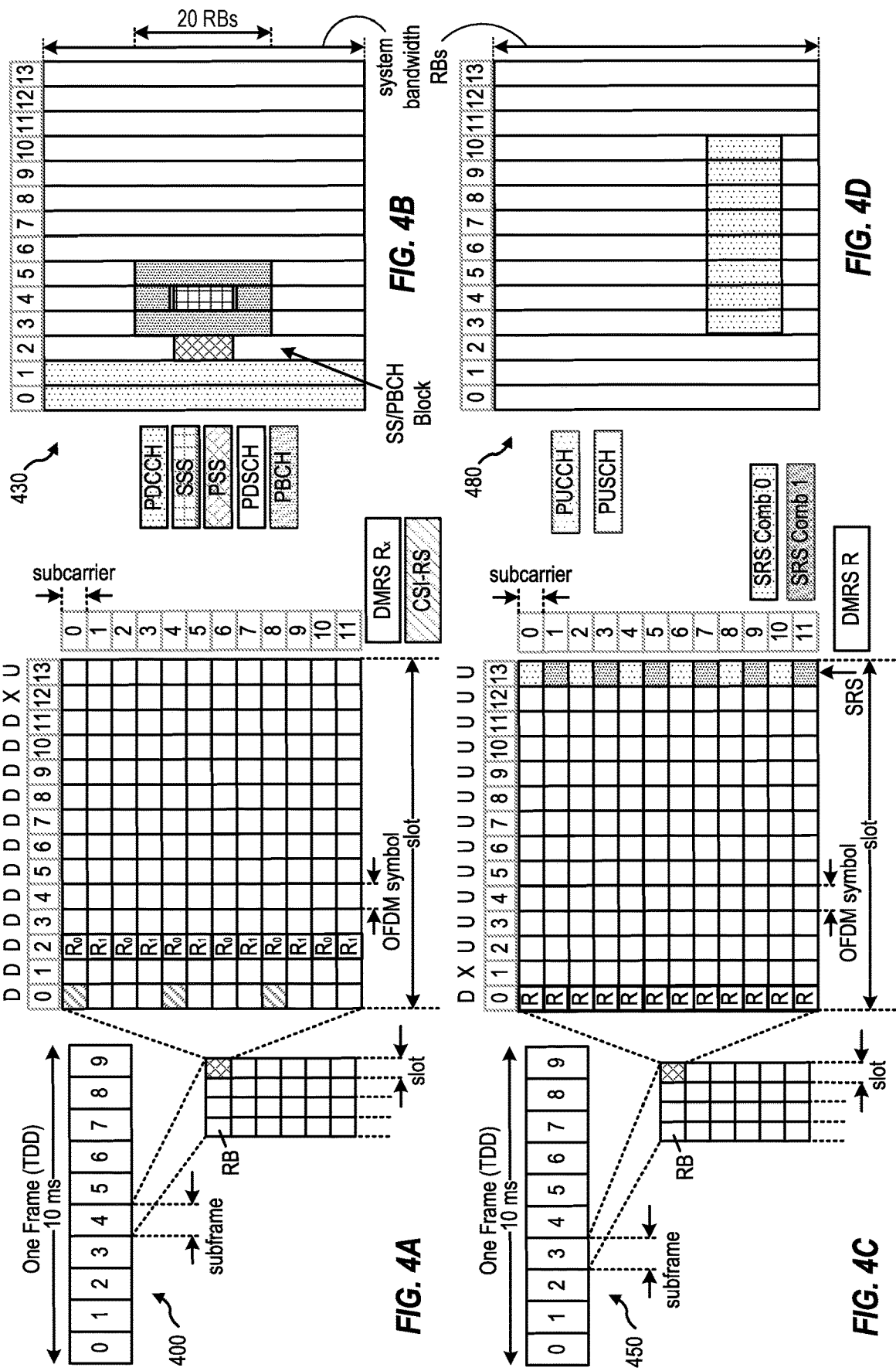

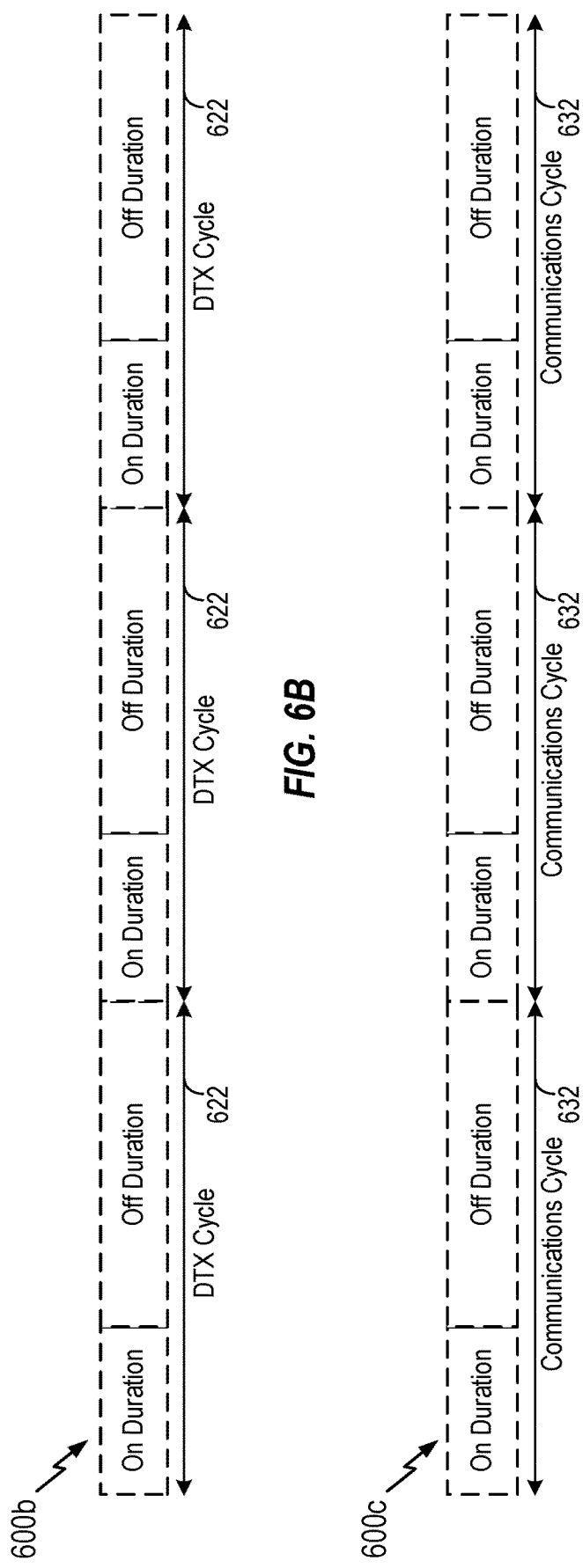

ENERGY REQUEST AND ENERGY REPORT COMMUNICATIONS FOR ENERGY HARVESTING USER EQUIPMENTS

BACKGROUND

Field of the Disclosure

Aspects of the present disclosure relate to wireless communications, and more particularly, to techniques for communicating energy harvesting related information between a user equipment (UE) and a network node.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes sending, to a network node, an energy request indication in an energy request occasion, the energy request indication indicating a request for the UE to send an energy request report to the network node; sending, to the network node after sending the energy request indication, the energy request report, the energy request report indicating a request for the network node to transmit power to the UE or a request for time for the UE to harvest energy; sending, to the network node, an energy report indication in an energy report occasion, the energy report indication indicating a request for the UE to send an energy report to the network node; and sending, to the network node after sending the energy report indication, the energy report, the energy report indicating to the network node at least one communication capability of the UE based on an energy level of the UE.

Another aspect provides a method for wireless communications by a network node. The method includes receiving, from a UE, an energy request indication in an energy request occasion, the energy request indication indicating a request for the UE to send an energy request report to the network node; receiving, from the UE after receiving the energy request indication, the energy request report, the energy request report indicating a request for the network node to transmit power to the UE or a request for time for the UE to harvest energy; receiving, from the UE, an energy report indication in an energy report occasion, the energy report indication indicating a request for the UE to send an energy report to the network node; and receiving, from the UE after receiving the energy report indication, the energy report, the energy report indicating to the network node at least one communication capability of the UE based on an energy level of the UE.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 6A-6C depict example timelines of EH UE communications.

DETAILED DESCRIPTION

Figure 1:
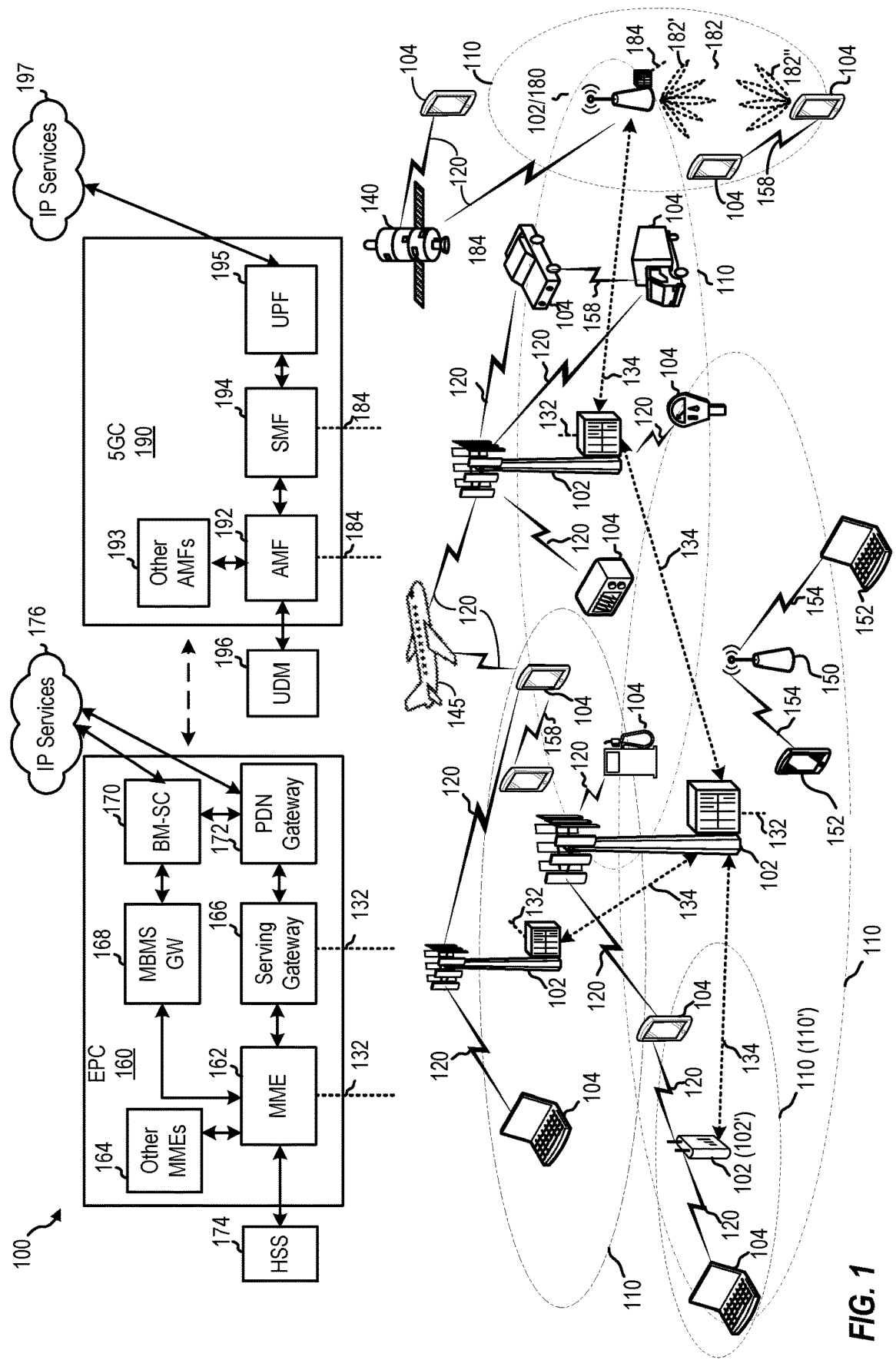
FIG. 1 depicts an example wireless communications network.

An energy harvesting (EH) UE may be configured to harvest energy and use that energy to perform different communications, such as with a base station (BS). For example, the BS may schedule the EH UE to perform different communication tasks at different times. However, the EH UE may not have sufficient energy to perform certain communication tasks at certain times, such as if the EH UE is unable to harvest sufficient energy.

Accordingly, aspects herein provide techniques for an EH UE to request energy from the BS and/or request time to harvest energy from the BS, such that the EH UE has sufficient energy to perform scheduled communication tasks. Further, aspects herein provide techniques for an EH UE to report its communication capabilities to the BS based on its energy levels, such that the BS can schedule the EH UE to perform communication tasks at times that it is likely the EH UE will have sufficient energy to perform the communication tasks.

In particular, aspects of the present disclosure provide apparatuses, methods, processing systems, and computer-readable mediums for communicating energy harvesting related information between a UE and a network node. As discussed herein, communicating may refer to receiving and/or transmitting signals, such as over any suitable air interface or link (e.g., a Uu link, sidelink, PC5 interface, etc.).

In certain aspects, an energy harvesting UE is configured to harvest energy from one or more external sources. The one or more external sources may include: solar energy, thermal energy, kinetic energy, radio frequency (RF) energy, electromagnetic radiation (EMR), other types of ambient energy, and the like. For example, an EH UE may include one or more components that allow the EH UE to harvest energy, such as solar cells, RF power converters, and the like. One type of EH UE is a passive Internet of Things (IoT) device. Passive IoT devices may generally have limited energy storage capabilities, such as limited storage batteries or a capacitor or other short term energy storage device.

EH UEs may be configured to harvest energy and use that energy to perform communication tasks, such as receiving signals, transmitting signals, processing received signals, processing signals for transmissions, etc. In some cases, an EH UE may harvest power until sufficient power is stored at the EH UE to perform a communication task. The time needed for the EH UE to harvest sufficient power may be based on a charging rate of the EH UE and an amount of power needed to perform the communication task. For example, a higher charging rate may require less time to harvest sufficient energy, and a lower charging rate may require more time to harvest sufficient energy.

In certain aspects, a network node is configured to provide energy to an EH UE. For example, the network node can emit a directed energy beam (e.g., a laser or other concentrated light beam) at an EH UE and the EH UE may harvest the directed energy using a suitable energy harvesting component, such as one or more solar cells. In another example, the network node can direct RF signals (e.g., RF signals specifically for transferring energy, data carrying RF signals, etc.) at an EH UE and the EH UE may harvest the RF energy using an antenna, coil, or similar RF capturing device and a power converter. In certain aspects, the network node is not configured to provide energy to the EH UE, and the EH UE instead harvests energy derived from other sources, such as ambient RF energy (e.g., from Wi-Fi signals, Bluetooth® signals, etc.), solar energy, thermal energy, and/or the like.

Certain aspects herein provide techniques for an EH UE to send a request for energy, referred to as an energy request report, to a network node. In certain aspects, the energy request report indicates a request for the network node to transmit power to the UE, such as by directing a laser beam or RF signals at the EH UE. In certain aspects, the energy request report indicates a request for time for the UE to harvest energy. For example, the EH UE may not have sufficient power to perform a communication task. Therefore, the EH UE may request time to harvest energy in order to store energy sufficient to perform the communication task and/or to request the network node to transmit power to the EH UE. For example, the network node may be configured to schedule resources (e.g., time resources, frequency resources, and/or spatial resources) for the EH UE to perform the communication task. In some aspects, the network node may schedule the resources to occur at a time based on the energy request report, such as after allowing sufficient time for the EH UE to harvest energy and/or after transmitting energy to the EH UE. Such techniques, therefore, solve the technical problem of an EH UE having insufficient energy to perform communication tasks by, in certain aspects, allowing the network node to provide sufficient energy to the EH UE and/or time for the EH UE to harvest sufficient energy for performing communication tasks.

Certain aspects herein provide techniques for an EH UE to send an energy report to the network node. In certain aspects, the energy report indicates, to the network node, at least one communication capability of the UE based on an energy level of the UE. For example, a communication capability may indicate one or more communication tasks the EH UE can perform when the UE has a current and/or future predicted energy level of the UE. Accordingly, the network node may schedule resources for the EH UE to perform one or more communication tasks based on the energy report. For example, the network node may schedule resources to perform one or more communication tasks for which the EH UE currently has or is predicted to have sufficient power to perform, and not additional communication tasks for which the EH UE would not have sufficient power to perform. Such techniques, therefore, solve the technical problem of an EH UE having insufficient energy to perform communication tasks by, in certain aspects, allowing the network node to schedule the EH UE to perform communication tasks that the EH UE has, or is estimated to have, sufficient power to perform, and refrain from scheduling additional communication tasks for the EH UE to perform that the EH UE does not have, or is not estimated to have, sufficient power to perform.

Further, in certain cases, EH UE may have limited energy storage capacity, and therefore may have limited ability to transmit communications. Certain aspects herein solve the technical sub-problem of having limited ability to transmit communications by multiplexing the energy report and/or energy request report with one or more other signals when sending to the network node to avoid having to use power for separate transmissions.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). As such communications devices are part of wireless communications network 100, and facilitate wireless communications, such communications devices may be referred to as wireless communications devices. For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
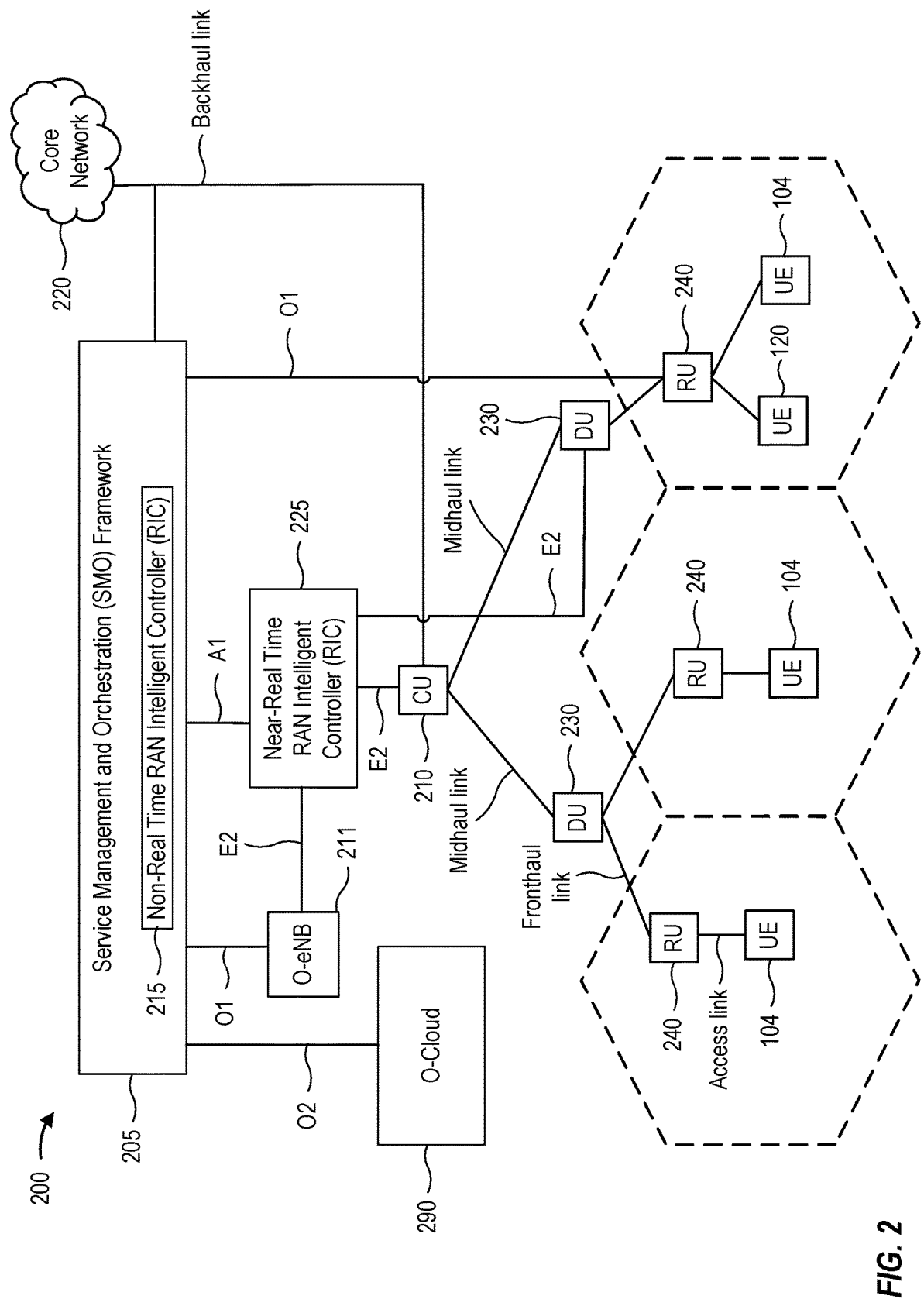
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mm Wave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration.

The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
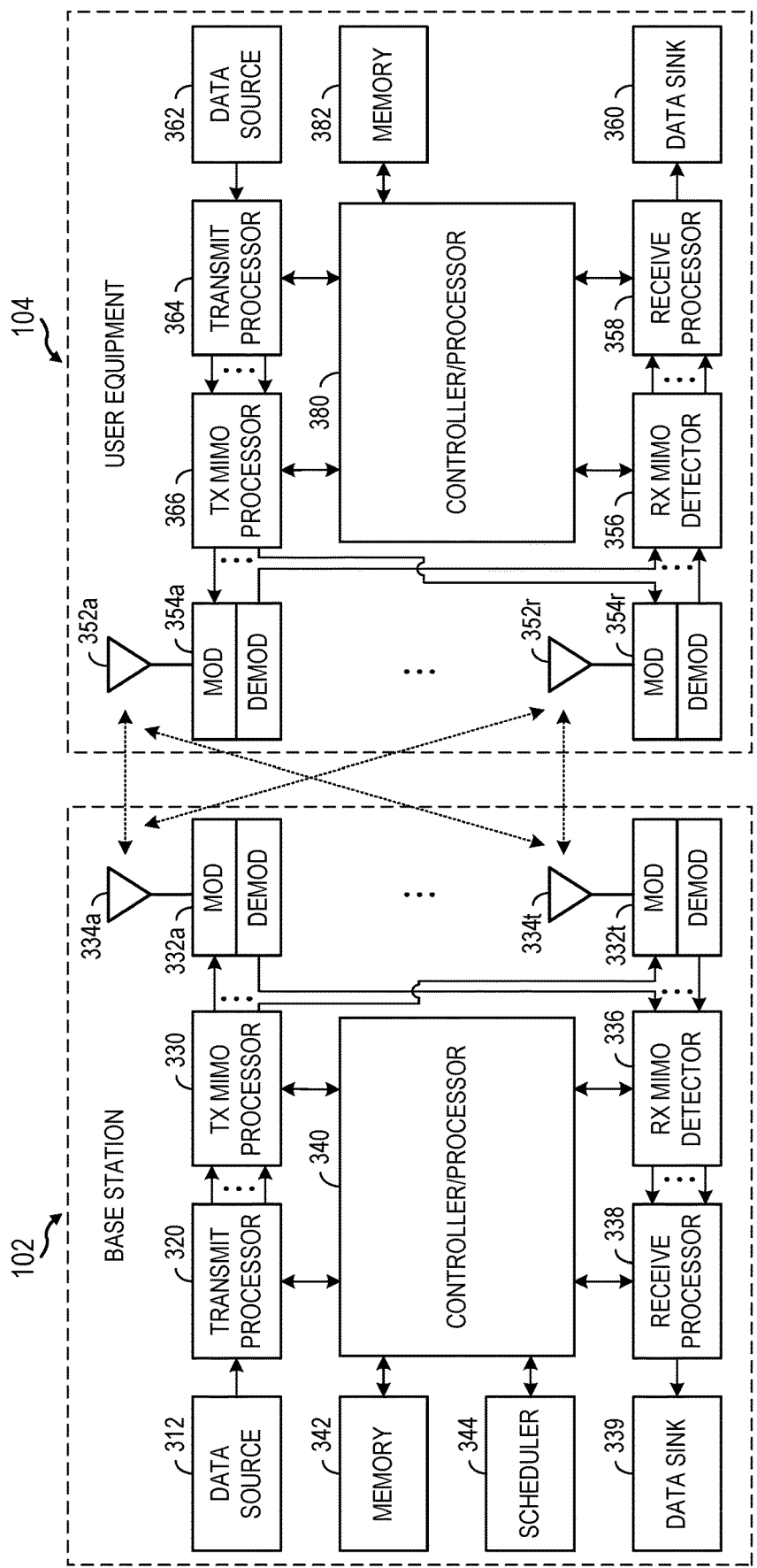
FIG. 3 depicts aspects of an example base station and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to RF Energy Harvesting User Equipments

As briefly discussed above, an EH UE generally includes one or more components configured for harvesting energy. For example, an EH UE may include one or more components to harvest RF energy. An EH UE configured to harvest RF energy may be referred to as an RF EH UE.

Figure 5A:
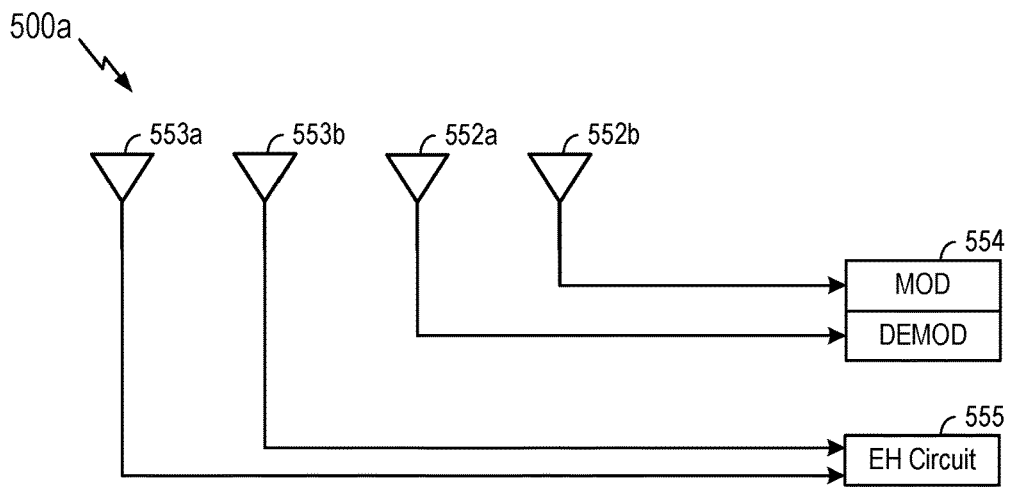
FIGS. 5A-5C depict examples of different architectures, including different components, that a radio frequency (RF) energy harvesting (EH) UE may include for harvesting RF energy.
Figure 5B:
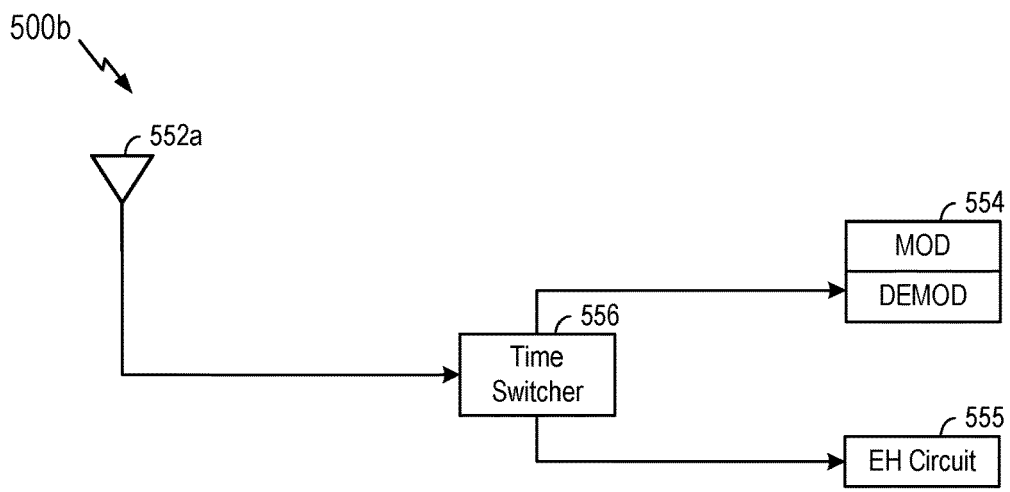
Figure 5C:
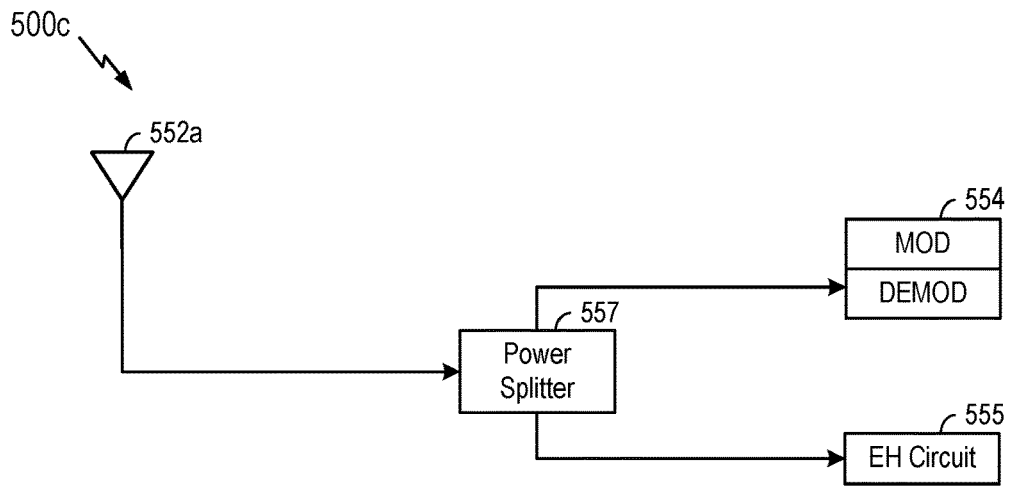

FIGS. 5A-5C illustrate examples of different architectures, including different components, that an RF EH UE may include for harvesting RF energy.

FIG. 5A illustrates an example separated receiver architecture 500a that may be included in a UE, such as UE 104 of FIGS. 1 and 3. In a separated receiver architecture, UE 104 includes separate antennas for RF energy harvesting and for information signal reception and decoding, such as control signals, data signals, etc. As shown, in separated receiver architecture 500a, UE 104 includes one or more antennas (shown as antennas 552a, 552b) that are coupled to components of UE 104 configured to decode the signals, such as one or more transceivers (shown as transceiver 554). For example, the antennas 552a, 552b may be antennas 352 of FIG. 3, and transceiver 554 may be a transceiver 354 of FIG. 3, which includes a modulator and a demodulator. Accordingly, antennas 552a, 552b are used for information signal reception and decoding in this example.

As shown, in separated receiver architecture 500a, UE 104 further includes one or more antennas 553 (shown as antennas 553a, 553b), which are coupled to components of UE 104 configured to harvest RF energy, such as one or more EH circuits, shown as EH circuit 555 in this example, which may include one or more power converters and/or the like for receiving RF energy and converting it into usable energy for UE 104. In the example architecture 500a, antennas 553 are separate from antennas 552, which enables the UE 104 to both harvest energy and receive and decode signals simultaneously without requiring the signal power of the received signal on an antenna to be split, such as between a transceiver 554 and EH circuit 555. However, this capability of separated receiver architecture 500a requires additional hardware, as in additional antennas, to be added to UE 104.

FIG. 5B illustrates an example time switching architecture 500b that may be included in a UE, such as UE 104 of FIGS. 1 and 3. In a time switching architecture, one or more antennas, shown as antenna 552a in this example, of UE 104 are shared for both RF energy harvesting and for information signal reception and decoding. In particular, in time switching architecture 500b, UE 104 includes a time switcher 556 that switches between separately coupling one or more transceivers, shown as transceiver 554 in this example, to antenna 552a, and coupling one or more EH circuits, shown as EH circuit 555 in this example, to antenna 552a. For example, at a first time, time switcher 556 may couple transceiver 554 to antennas 552a, and at a second time, time switcher 556 switches and couples EH circuit 555 to antenna 552a. Time switcher 556 may be configured to switch periodically or on some other schedule, such as based on one or more factors discussed herein, such as to align with an EH cycle configuration of the UE 104. Accordingly, using time switching architecture 500b, the UE 104 can only one of harvest energy or receive information signals for decoding at any given time. However, time switching architecture 500b does not require the signal power of the received signal on an antenna to be split, such as between a transceiver 554 and EH circuit 555. Further, time switching architecture 500b does not require additional antennas to be added to UE 104.

FIG. 5C illustrates an example power splitting architecture 500c that may be included in a UE, such as UE 104. In a power splitting architecture, one or more antennas, shown as antenna 552a in this example, of UE 104 are shared for both RF energy harvesting and for information signal reception and decoding. In particular, in power splitting architecture 500c, UE 104 includes a power splitter 557 that splits received signals between one or more transceivers, shown as transceiver 554 in this example, and one or more EH circuits, shown as EH circuit 555 in this example. In particular, both of transceiver 554 and EH circuit 555 receive signals received on antennas 552a, simultaneously. However, the receive power of the signal received antennas 552a may be split between transceiver 554 and EH circuit 555. Power splitting architecture 500c does not require additional antennas to be added to UE 104.

Aspects Related to EH Cycles

In certain aspects, an EH UE 104 is configured to harvest energy according to an EH cycle. An EH cycle generally defines at least a time period designated for the EH UE 104 to harvest energy (referred to as an EH time period) and a time period designated for the EH UE 104 to not harvest energy (referred to as a non-harvesting time period). In certain aspects, the non-harvesting time period may be used by the EH UE 104 to perform one or more communication tasks, and may be referred to as an active time period in such aspects.

Figure 6A:
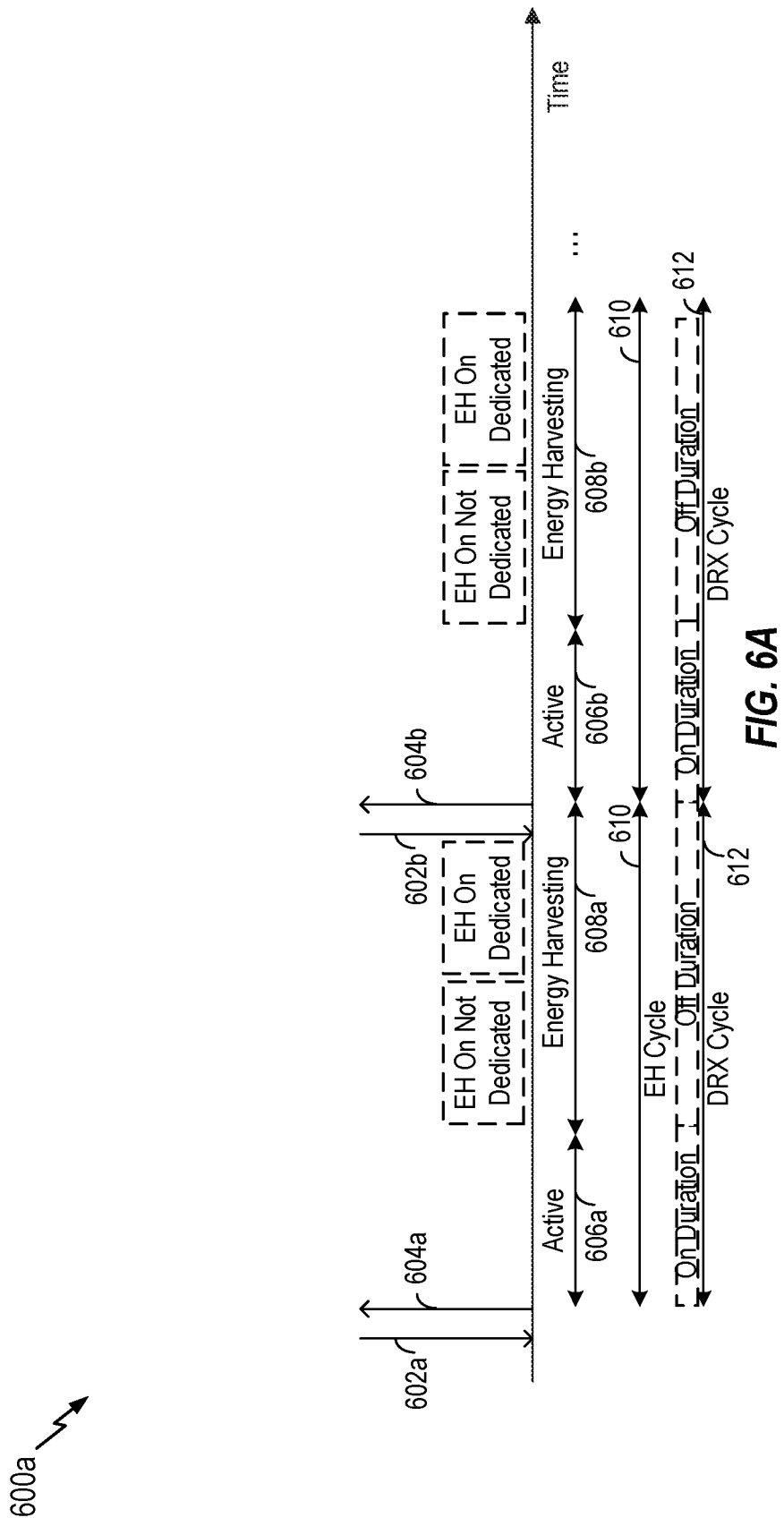

FIG. 6A illustrates an example timeline 600a of an EH cycle 610. In the illustrated example, EH cycle 610 recurs periodically in time. A first EH cycle 610 includes an active time period 606a and an energy harvesting time period 608a. A second EH cycle 610 includes an active time period 606b and an energy harvesting time period 608b.

In certain aspects, each energy harvesting time period 608 is further divided into two separate energy harvesting time periods, a first time period for harvesting energy on undedicated resources (e.g., for harvesting ambient energy) shown as "EH On Not Dedicated" in FIG. 6A, and a second time period for harvesting energy on dedicated resources (e.g., energy supplied by a network node, such as BS 102), shown as "EH On Dedicated" in FIG. 6A. Though certain aspects of communication between an EH UE and a BS are discussed herein as being performed by a BS such as BS 102 of FIGS. 1 and 3, such aspects may be performed by any suitable network node, such as a component of BS 102.

In certain aspects, EH UE 104 is configured by BS 102 with the parameters of the EH cycle, such as a start time and duration of the EH and/or active time periods, a duration of the EH cycle, and/or the like. Further, the BS 102 may be configured to update parameters of the EH cycle. For example, the BS 102 may use one or more of L1, L2, and/or L3 signaling to send the parameters, or indications of the parameters, of the EH cycle to EH UE 104. L1 signaling may refer to PHY layer signaling, examples of which include downlink control information (DCI) for downlink communication, signals on PUSCH for uplink communication, and/or the like. L2 signaling on the downlink may refer to SDAP layer signaling, examples of which include a medium access control (MAC) control element (CE) and/or the like. L3 signaling on the downlink may refer to RRC layer signaling, examples of which include RRC messages and/or the like.

In certain aspects, EH UE 104 may request parameters for the EH cycle using one or more of L1, L2, and/or L3 signaling, and the BS 102 may configure EH UE 104 with the requested parameters or different parameters. In certain aspects, EH UE 104 may send information, such as in an energy report as discussed herein, which BS 102 may use to determine parameters of the EH cycle.

In certain aspects, EH UE 104 is configured to communicate according to a discontinuous reception (DRX) cycle 612. A DRX cycle generally defines a time period, referred to as an off duration or a sleep time period, designated for the EH UE 104 not to have to monitor or receive signals, and a time period, referred to as an on duration or an active time period, designated for the EH UE 104 to monitor and receive signals. In certain aspects, the DRX cycle and the EH cycle are aligned in starting time and/or duration, such that they overlap in time. Further, in certain aspects, the on duration of the DRX cycle falls within the active time period of the EH cycle, such that the start time of the on duration is the same as or later than the start time of the active time period, and the end time of the on duration is the same or earlier than the end time of the active time period. Accordingly, in some cases, the EH UE 104 is configured to not monitor or receive signals during an EH time period, which, depending on the architecture used, such as a time switching architecture, may free EH UE 104 to harvest energy during the EH time period in order to allow the EH UE 104 to have sufficient power to perform communication tasks. It is noted that the monitoring and reception of signals during the on duration may refer to monitoring and reception of data or control signals, which are received and processed for information by EH UE 104. Such monitoring and reception of signals is in contrast to EH of RF signals, which may occur during the off duration, whereby energy from the signal is harvested, but the signal itself is not processed for information.

In certain aspects, EH UE 104 is configured to receive a wake up indication (WUI) 602 from BS 102 prior to the start of an EH cycle 610, shown as WUI 602a and WUI 602b in FIG. 6A. The WUI 602 may signal the beginning of an EH cycle 610 is upcoming and elicit a response from the EH UE 104. In certain aspects, in response to receiving the WUI 602, the EH UE 104 sends a wake up acknowledgement (WUA) 604 to BS 102, shown as WUA 604a and WUA 604b. The EH UE 104 may indicate in the WUA 604 whether or not it has sufficient power to wakeup for the upcoming active time period 606 of the EH cycle 610 to perform one or more communication tasks. For example, the EH UE 104 may indicate in the WUA 604a that it has sufficient power to perform one or more communication tasks during the active time period 606a, and thereafter may perform the one or more communication tasks during the active time period 606a.

In another example, the EH UE 104 may indicate in the WUA 604b that it does not have sufficient power to perform one or more communication tasks during the active time period 606b, and accordingly may continue to harvest energy during active time period 606b and/or sleep during active time period 606b.

In certain aspects, WUA 604 includes a binary indication of whether or not EH UE 104 has sufficient power, which may be beneficial in power constrained contexts because the communication overhead of a binary indication is relatively low. In certain aspects, WUA 604 indicates how much power EH UE 104 has, such as a number and/or types of one or more communication tasks the EH UE 104 has sufficient power to perform. For example, BS 102 and EH UE 104 may be configured with a mapping of values to communication tasks, and therefore, WUA 604 may include a value that maps to a communication task. In certain aspects, WUA 604 indicates how much power EH UE 104 requests or a number of EH cycles 610 EH UE 104 requests to harvest energy before performing one or more communication tasks.

In certain aspects, when BS 102 receives a WUA 604 indicating EH UE 104 does not have sufficient power to perform one or more communication tasks, BS 102 schedules (referring to initial scheduling or rescheduling) the one or more communication tasks to another one or more time periods (e.g., EH cycle(s)).

In certain aspects, EH UE 104 may request a particular time period (e.g., recurring time period) for scheduling resources (e.g., frequency and/or spatial resources) for communicating WUI and/or WUA, such as using one or more of L1, L2, and/or L3 signaling, and the BS 102 may configure EH UE 104 with resources for communicating WUI and/or WUA accordingly.

In certain aspects, the EH cycle configuration, including the active time period duration and the energy harvesting time period duration, is configured based on one or more parameters of EH UE 104, including in some aspects one or more of an estimated input power $P_x$ to EH UE 104, a power conversion efficiency nx of the energy harvesting circuit of EH UE 104, and an average estimated power consumption $P_y$ of the EH UE 104 to perform communication tasks.

In particular, an example condition for operation of EH UE 104 is shown in equation 1:

$$P_x \eta_x X \geq P_y Y \quad (1)$$

In Equation 1, X is the duration EH UE 104 performs energy harvesting, and Y is the duration that EH UE 104 performs one or more communication tasks. In particular, the estimated energy that an EH UE 104 harvests is $P_x \eta_x X$ while the estimated energy the EH UE 104 consumes is $P_y Y$. Therefore, to operate, the energy harvested should be greater than or equal to the energy consumed.

Thus, the ratio of X to Y, which may be used as the ratio of the energy harvesting time period duration to the ratio of the active time period duration, which may be referred to as the EH-to-Activity time ratio, may be designed such that:

$$\frac{X}{Y} \geq \frac{P_y}{P_x \cdot \eta_x} \quad (2)$$

Accordingly, in certain aspects EH UE 104 sends information indicative of estimates of $P_x$, $\eta_x$, and/or $P_y$ to BS 102, such that BS 102 can configure EH cycle 610 such that the example condition for operation of EH UE 104 shown in Equation 1 is met. In certain aspects, BS 102 configures EH cycles 610 conservatively, such as to allow a longer energy harvesting time period with some margin for additional energy harvesting.

In certain aspects, where a DRX cycle and EH cycle do not align in time, and an on duration of the DRX cycle falls within an EH time period of the EH cycle, the on duration of the DRX cycle may be scheduled for a different time or canceled, such as independently by EH UE 104, or as signaled to EH UE 104 by BS 102.

In certain aspects, BS 102 sends UL or DL grants to EH UE 104 or configures EH UE 104 with DL or UL grants based on the EH cycle, such as during an active period.

Aspects Related to Duty Cycled Communications of an EH UE

As discussed, in certain aspects, EH UE 104 is configured to communicate according to a DRX cycle 612, as shown in FIG. 6A. A DRX cycle is a type of duty cycled communication. Duty cycled communications may refer to cycles for communications that recur periodically, and in each cycle, there is an active period for one or more types of communications and an inactive period for one or more types of communications. In certain aspects, during the active period, EH UE 104 is configured to communicate (e.g., transmit and/or receive), and during the inactive period, EH UE 104 is configured to refrain from communicating (e.g., transmit and/or receive). In certain aspects, EH UE 104 is configured to communicate according to one or more types of duty cycled communications, such as by communicating according to DRX cycles, discontinuous transmission (DTX) cycles, and/or communications cycles.

FIG. 6B illustrates an example timeline 600b of a DTX cycle 622. A DTX cycle generally defines a time period, referred to as an off duration or a sleep time period, designated for the EH UE 104 not to have to transmit signals, and a time period, referred to as an on duration or an active time period, designated for the EH UE 104 to transmit signals. In certain aspects, the DTX cycle and the EH cycle are aligned in starting time and/or duration, such that they overlap in time. Further, in certain aspects, the on duration of the DTX cycle falls within the active time period of the EH cycle, such that the start time of the on duration is the same as or later than the start time of the active time period, and the end time of the on duration is the same or earlier than the end time of the active time period. Accordingly, in some cases, the EH UE 104 is configured to not transmit signals during an EH time period, which, depending on the architecture used, such as a time switching architecture, may free EH UE 104 to harvest energy during the EH time period in order to allow the EH UE 104 to have sufficient power to perform communication tasks.

FIG. 6C illustrates an example timeline 600c of a communications cycle 632. A communications cycle generally defines a time period, referred to as an off duration or a sleep time period, designated for the EH UE 104 not to have to transmit or receive signals, and a time period, referred to as an on duration or an active time period, designated for the EH UE 104 to be able to transmit and receive signals. In particular, during the on duration, EH UE 104 is able to transmit signals as needed and is able to receive signals as needed. Further, during the off duration EH UE 104 refrains from transmitting and refrains from receiving signals. In certain aspects, the communications cycle and the EH cycle are aligned in starting time and/or duration, such that they overlap in time. Further, in certain aspects, the on duration of the communications cycle falls within the active time period of the EH cycle, such that the start time of the on duration is the same as or later than the start time of the active time period, and the end time of the on duration is the same or earlier than the end time of the active time period. Accordingly, in some cases, the EH UE 104 is configured to not transmit or receive signals during an EH time period, which, depending on the architecture used, such as a time switching architecture, may free EH UE 104 to harvest energy during the EH time period in order to allow the EH UE 104 to have sufficient power to perform communication tasks.

In certain aspects, EH UE 104 is configured to communicate according to a DRX cycle and a DTX cycle. For example, BS 102 may send an indication of configuration parameters for each of a DRX cycle and a DTX cycle to EH UE 104, such as using one or more of L1, L2, or L3 signaling. Accordingly, in certain aspects, EH UE 104 is configured to receive signals during the on duration of the DRX cycle, transmit signals during the on duration of the DTX cycle, and refrain from transmitting and receiving signals during the overlap in off durations of the DTX and DRX cycles.

In certain aspects, EH UE 104 is configured to communicate according to a communications cycle as discussed. For example, BS 102 may send an indication of configuration parameters for a communications cycle to EH UE 104, such as using one or more of L1, L2, or L3 signaling.

In certain aspects, EH UE 104 is configured to communicate according to a DRX cycle. For example, BS 102 may send an indication of configuration parameters for a DRX cycle to EH UE 104, such as using one or more of L1, L2, or L3 signaling. Accordingly, in certain aspects, EH UE 104 is configured to receive signals during the on duration of the DRX cycle, refrain from receiving signals during the off duration of the DRX cycle, and transmit signals at any time during the DRX cycle (transmission can occur during the on duration or the off duration).

In certain aspects, EH UE 104 is configured to report a preferred one or more cycle configurations, such as one or more DRX configurations, one or more DTX configurations, and/or one or more communications cycle configurations to BS 102, such as using one or more of L1, L2, or L3 signaling. In certain aspects, each cycle configuration indicates one or more of a duration of the cycle, a duration of the on duration, a duration of the off duration, and/or the like. In certain aspects, BS 102 selects one or more cycle configurations based on the report, such as one of the preferred one or more cycle configurations, and sends an indication of the one or more cycle configurations to EH UE 104, such as using one or more of L1, L2, or L3 signaling.

In certain aspects, BS 102 is configured to send an indication of a plurality of possible cycle configurations to EH UE 104. Further, EH UE 104 is configured to report the preferred one or more cycle configurations as selected from the plurality of possible cycle configurations.

In certain aspects, EH UE 104 is configured to update or change its preferred one or more cycle configurations, and report the update to the BS 102. Further, BS 102 selects one or more cycle configurations based on the report including the update, and send an indication of one or more cycle configurations to EH UE 104, such as using one or more of L1, L2, or L3 signaling.

In certain aspects, the EH UE 104 is configured to report the preferred one or more cycle configurations in an energy report and/or energy request report, as further discussed herein. In certain aspects, the preferred one or more cycle configurations are selected by the EH UE 104 based on one or more of a slot type, as discussed herein, a power level for transmission by EH UE 104, and/or any other communication capability of EH UE 104 and/or communication task to be performed by EH UE 104 as discussed herein. For example, the preferred one or more cycle configuration may be selected such that the EH UE 104 has sufficient power to communication according to the slot type, power level for transmission, etc.

Aspects Related to Power Consumption at an EH UE

In certain aspects, an EH UE 104 can estimate how much power it consumes to perform a particular communication task. In certain aspects, the estimate is, at least in part, based on a frequency bandwidth used for the communication. In certain aspects, EH UE 104 is configured to send information to BS 102 indicative of an estimate of how much power it consumes to perform one or more communication tasks, such as using one or more of L1, L2, or L3 signaling.

In certain aspects, the estimate is normalized to a particular bandwidth, such as one RE or RB, or a particular number of REs or RBs. Accordingly, the BS 102 can determine how much power the EH UE 104 is estimated to consume for performing a particular communication task, by using the normalized estimate, and multiplying it by the ratio of 1) the actual bandwidth for the communication task as scheduled to 2) the particular bandwidth used for normalization.

In certain aspects, the information indicative of an estimate of how much power EH UE 104 will consume to perform one or more communication tasks is sent by EH UE 104 to BS 102 using one or more of L1, L2, or L3 signaling. The information may be updated by EH UE 104 over time.

In certain aspects, the BS 102 and/or the EH UE 104 initially estimates the power to perform one or more communication tasks based on a device class of EH UE 104 (e.g., a UE power class as defined in a standard, such as 3GPP TS 38.101). For example, each UE power class may be associated with default or initial estimates for the one or more communication tasks. EH UE 104 may update estimates as it monitors actual power consumption to perform one or more communication tasks.

In certain aspects, the estimated power consumed to perform one or more communication tasks refers to one or more of: power consumed to process a DMRS signal (PDMRS), power consumed to process a low density parity check (LPDC) coded data signal (PDATA), power consumed to process PDATA coded with a particular modulation coding scheme (MCS) (e.g., as a function of coding rate only, modulation order only, or both), power consumed to process a polar-coded information signal (PCONTROL POLAR), power consumed to process a polar-coded DCI (PPDCCH), power consumed to process a sequence-based control signal (PCONTROL SEQ), power consumed to process a first type of RS signal (e.g., DMRS), power consumed to process a second type of RS signal (e.g., SS block), power consumed to process a third type of RS signal (e.g., CSI-RS) (e.g., as a function of a number of CSI-RS ports), power consumed to process UL and/or DL data (e.g., as a function of the MCS of the data), power consumed to process received PDCCH or control signals (e.g., as a function of a format (e.g., bit size)), power consumed to process transmitted PUCCH (e.g., encoding, preparation, etc.) (e.g., as a function of format (e.g., waveform, DMRS/data structure, encoding procedure, etc.)), power consumed to not monitor signals (e.g., microsleep power consumption where EH UE 104 is ready to receive, but not actively receiving, such as detecting no DCI based on DCI DMRS), power consumed from battery leakage, and/or the like. In certain aspects, EH UE 104 is configured to send information to BS 102 indicative of a battery size (e.g., energy capacity (e.g., current or nominal capacity)) of EH UE 104.

In certain aspects, BS 102 is configured to use such estimated power consumption and/or battery size information of EH UE 104 to determine a transmit power level of EH UE 104, EH cycle configuration for EH UE 104, and/or schedule communication tasks for EH UE 104. For example, BS 102 configures transmit power, EH cycle configuration, or communication task scheduling using one or more of L1, L2, or L3 signaling.

In certain aspects, one or more slot types (also referred to as slot formats) are defined for EH UE 104 statically or dynamically by BS 102 using one or more of L1, L2, or L3 signaling. In certain aspects, the one or more slot types defined for EH UE 104 are based on a device class of EH UE 104. For example, a first device class may have a first set of one or more slot types defined for communication, while a second device class may have a second set of one or more slot types defined for communication.

Figure 7:
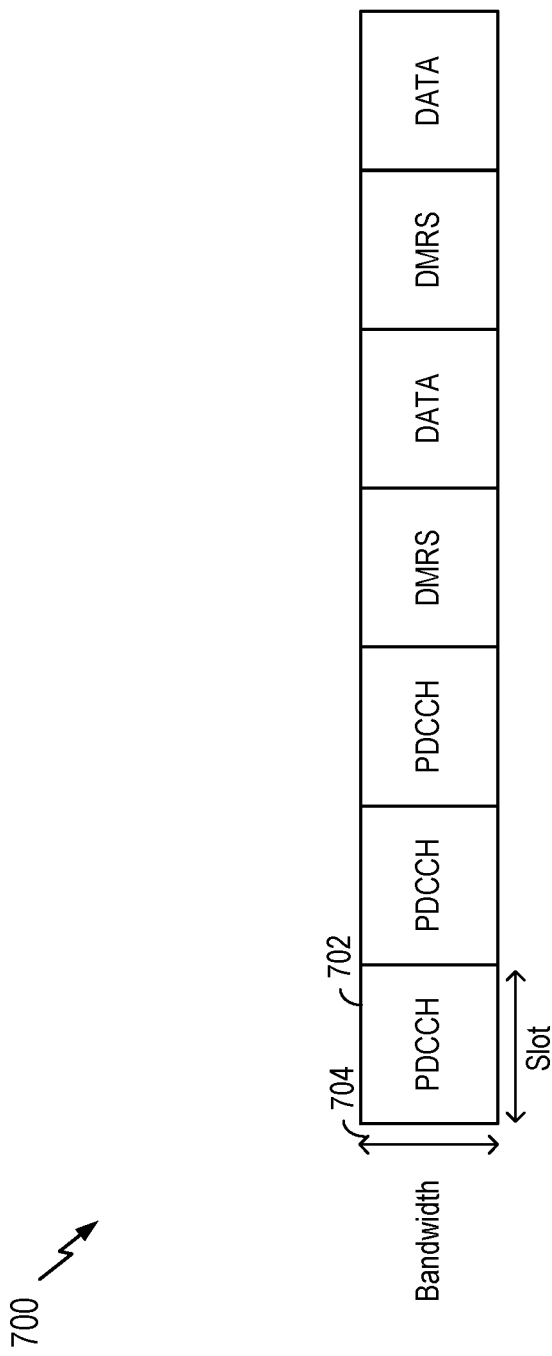
FIG. 7 depicts an example slot type over a bandwidth.

FIG. 7 illustrates an example slot type 700 over a bandwidth 704 (e.g., 1 RB). As shown, slot type 700 includes 7 symbols 702, each symbol used for a particular type of communication task. In particular, the first three symbols is designated for EH UE 104 to receive PDCCH, the next symbol is designated for EH UE 104 to receive DMRS, the next symbol is designated for EH UE 104 to receive data, the next symbol is designated for EH UE 104 to receive DMRS, and the next symbol is designated for EH UE 104 to receive data. Accordingly, a slot type may refer to a pattern of how each symbol of the slot is used for communication. Symbols may be used for other types of communication, such as PDSCH, PSSCH, PUSCH, PUCCH, PDCCH, PSCCH, and the like.

In certain aspects, the information indicative of an estimate of how much power EH UE 104 consumes to perform one or more communication tasks sent by EH UE 104 to BS 102 includes information indicative of an estimate of an amount of power consumed to communicate according to a slot type. In certain aspects, the information indicative of an estimate of how much power EH UE 104 consumes to perform one or more communication tasks sent by EH UE 104 to BS 102 includes information indicative of an estimate of an amount of power consumed for each type of communication included in each slot type defined for EH UE 104. For example, if EH UE 104 has one or more slot types defined, and symbols in those slot types are used for one or more particular communication tasks, EH UE 104 includes information indicative of an estimate of an amount of power consumed for each of the one or more particular communication tasks.

Aspects Related to Power States of an EH UE

In certain aspects, an EH UE 104 can operate in different states. For example, the states may include one or more of a communication state, a control signal monitoring and transmission state, a control signal monitoring state, and an energy harvesting only state (also referred to as a charging state). When in a communication state, EH UE 104 is ready to communicate, such as transmit or receive data. When in a control signal monitoring and transmission state, EH UE 104 is able to monitor (e.g., receive and decode) control signals and transmit information related to monitoring of the control signals, such as transmitting an acknowledgement (ACK) or negative ACK (NACK). When in a control signal monitoring state, EH UE 104 is able to monitor for control signals. When in an energy harvesting only state, EH UE 104 is able to harvest energy, but not able to process data or control signals. These are just some examples, and other configurations are possible.

In certain aspects, EH UE 104 may be in an energy harvesting only state during an energy harvesting time period of an EH cycle. In certain aspects, EH UE 104 may be in a communication state during an active time period of an EH cycle or an on duration of a DRX cycle. In certain aspects, EH UE 104 may be in a control signal monitoring state or control signal monitoring and transmission state when communicating WUI/WUA for an EH cycle.

In certain aspects, a communication state can be composed of multiple battery states, and EH UE 104, in a communication state, can be in one of the multiple battery states. In certain aspects, a battery state defines which and how many of one or more communication tasks EH UE 104 can perform, such as based on a current power level of EH UE 104.

For example, a first battery state may define that EH UE 104 can receive a certain number of signals, such as a certain number of transmissions or transport blocks (TBs) spanning a certain number of time-frequency resources (e.g., REs, RBs, symbols, subcarriers, etc.) within a certain period of time (e.g., a number of slots). A TB is a unit of data payload transferred from the MAC layer to the PHY layer, and may have a defined size referred to as a TB size.

A second battery state may define that EH UE 104 can transmit a certain number of signals, such as a certain number of transmissions or TBs spanning a certain number of time-frequency resources within a certain period of time using a first transmit power.

A third battery state may define that EH UE 104 can transmit a certain number of signals, such as a certain number of transmissions or TBs spanning a certain number of time-frequency resources within a certain period of time using a second transmit power.

In certain aspects EH UE 104 sends information indicative of its battery state to BS 102. In certain aspects, BS 102 schedules communications for EH UE 104, such as during an active time period of an EH cycle, based on the battery state of EH UE 104. For example, BS 102 schedules transmission or reception of a number of signals that EH UE 104 is capable of transmitting or receiving based on its battery state.

Aspects Related to Energy Request Reporting

As discussed, an EH UE 104 may send a request for energy, referred to as an energy request report, to a network node, such as BS 102. In certain aspects, the energy request report indicates a request for BS 102 to transmit power to EH UE 104, such as by directing a laser beam or RF signals at EH UE 104. In certain aspects, the energy request report indicates a request for time for EH UE 104 to harvest energy.

For example, EH UE 104 may have a number of bits in an UL buffer of EH UE 104 to transmit, which may be divided among one or more TBs, and therefore may request energy to transmit the bits.

In another example, BS 102 may indicate to EH UE 104 that BS 102 has a number of bits in a DL buffer of BS 102 to transmit to EH UE 104. The bits may be divided among one or more TBs. Therefore, EH UE 104 may request energy to receive and decode the bits.

In certain aspects, EH UE 104 is configured to send an energy request indication in an energy request occasion (ERO) to BS 102. The energy request indication indicates a request by the EH UE 104 to send the energy request report to the BS 102. Accordingly, after transmitting the energy request indication in the ERO, EH UE 104 is configured to transmit the energy request report to the BS 102. For example, when an EH UE 104 has insufficient power to perform one or more communication tasks, it may send an energy request indication in an ERO. In another example, when an EH UE 104 has sufficient power to perform one or more communication tasks, it may refrain from transmitting an energy request indication in the ERO.

Figure 8:
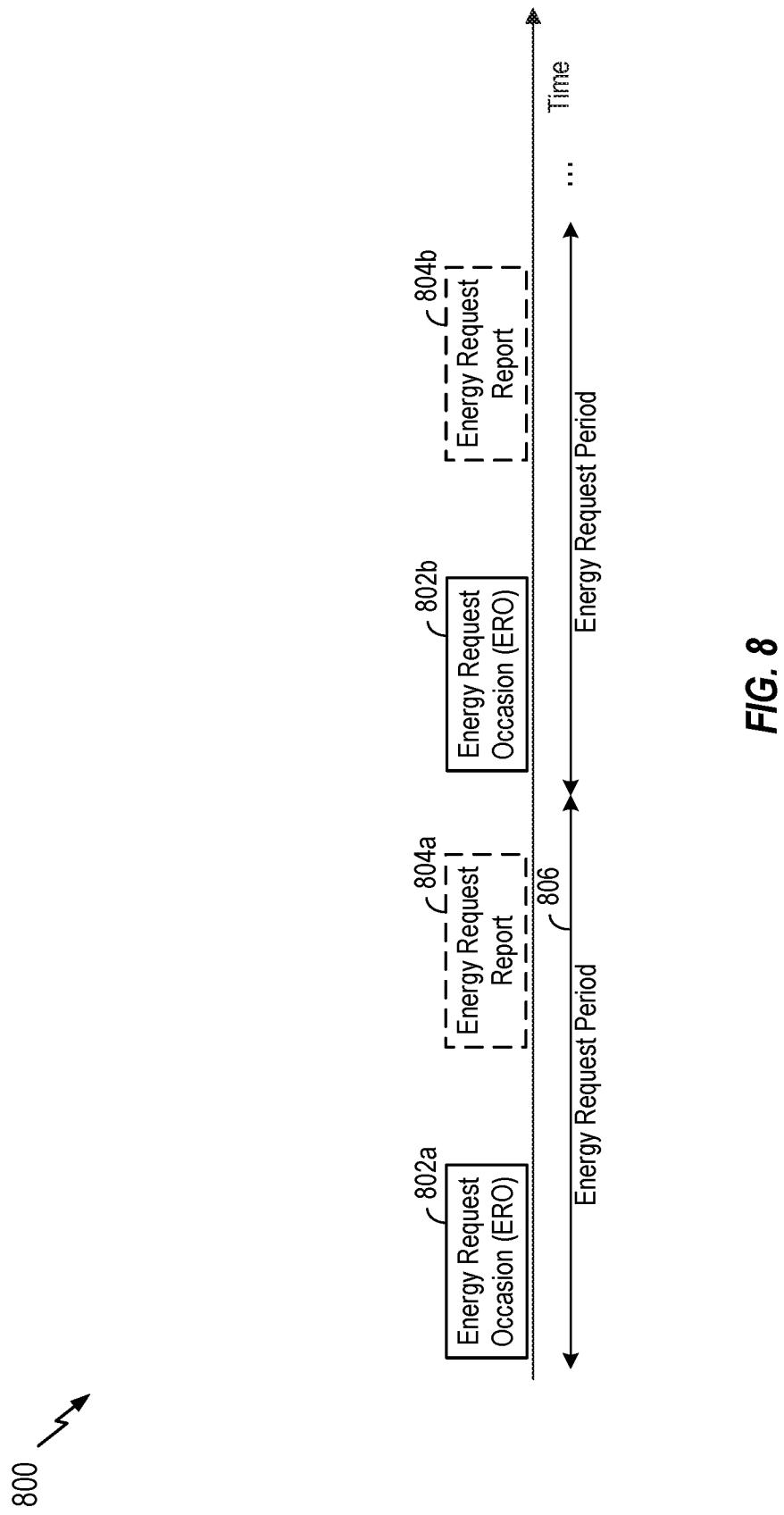
FIG. 8 depicts an example timeline for energy request reporting.

FIG. 8 illustrates an example timeline 800 for energy request reporting. As shown, energy request periods 806 may occur periodically in time. Each energy request period may include one or more EROs 802, shown as ERO 802a for a first energy request period and ERO 802b for a second energy request period. As discussed, if EH UE 104 transmits an energy request indication in an ERO, EH UE 104 is configured to transmit an energy request report 804 in the energy request period after transmitting the energy request indication. An energy request report is considered associated with an ERO when the energy request report is transmitted in response to transmission of an energy request indication in the ERO. For example, where EH UE 104 transmits an energy request indication in ERO 802*a*, EH UE 104 further transmits an energy request report 804*a*. Further, where EH UE 104 transmits an energy request indication in ERO 802*b*, EH UE 104 further transmits an energy request report 804*b*.

In certain aspects, the resources (e.g., time-frequency resources, such as RBs, REs, and/or other spatial resources) used by EH UE 104 to transmit an energy request report can be indicated to BS 102 by the energy request indication transmitted prior to transmitting the energy request report. For example, the energy request indication may include a sequence of bits (e.g., a bitmap), and different sequences of the bits may map to different resources.

In certain aspects, EH UE 104 is configured by BS 102 with one or more EROs, such as using one or more of L1, L2, or L3 signaling. For example, each ERO may span one or more resources in time and frequency. The one or more resources of an ERO may or may not be contiguous. The BS 102 indicates which resources one or more EROs occupy (e.g., which periodic resources). In certain aspects, different EROs may be associated with different wireless transfer technologies (e.g., RF power transfer from BS 102 to EH UE 104, laser power transfer from BS 102 to EH UE 104, and/or the like). By associating different EROs with different wireless transfer technologies, in some cases, EH UEs that support multiple types of wireless power transfer can advantageously be supported.

For example, in certain aspects, EH UE 104 is configured to receive an indication of a periodicity of EROs from BS 102, such as using one or more of L1, L2, or L3 signaling. BS 102 may further send an indication of an updated periodicity of EROs to EH UE 104, such as based on information (e.g., charging rate, discharging rate, energy level, and/or the like of EH UE 104) received in one or more energy request reports from EH UE 104. For example, a higher discharging rate, lower charging rate and/or lower energy level may lead to an increased periodicity, while a lower discharging rate, higher charging rate, and/or higher energy level may lead to a decreased periodicity. Adjustability of periodicity of EROs, in some cases, advantageously allows for more resources to be dedicated to EROs as needed, such as when EH UE 104 is likely to need to make more requests, and for less resources to be dedicated to EROs (thereby freeing such resources for other communications) when likely not needed by EH UE 104.

In certain aspects, an initial periodicity of EROs is based on a device class of EH UE 104, which may be associated with to a nominal or expected charging and/or discharging rate. For example, different device classes may be associated with different initial periodicities. In certain aspects, EH UE 104 sends an indication of its device class to BS 102, such as using one or more of L1, L2, or L3 signaling. In certain aspects, EH UE 104 may indicate a requested periodicity of EROs to BS 102, such as using one or more of L1, L2, or L3 signaling (e.g., multiplexed with other signals or not).

In certain aspects, EH UE 104 is configured to transmit an energy request indication in an ERO when one or more conditions are met. The one or more conditions may include, for example, one or more of: a current charging rate of EH UE 104 being below a first threshold charging rate; a predicted charging rate of EH UE 104 for a first future time period being below a second threshold charging rate; a current discharging rate of EH UE 104 being above a first threshold discharging rate; a predicted discharging rate of EH UE 104 for a second future time period being above a second threshold discharging rate; a current energy level of EH UE 104; or a data arrival rate at EH UE 104. In certain aspects, the one or more conditions include a data arrival rate being above a threshold, where the threshold is further takes into account a charging rate and/or discharging rate of the EH UE 104.

For example, EH UE 104 may have a threshold charging rate such that it can harvest sufficient energy during an energy harvesting period to perform one or more communication tasks during an active period. If the actual charging rate or a predicted charging rate (e.g., taking into account battery leakage, energy leakage, communication schedule on UL, DL, and/or sidelink) for performing energy harvesting is lower than the threshold charging rate, EH UE 104 may send an energy request indication and a corresponding energy request report to BS 102 requesting a higher transfer power and/or more time to harvest energy than currently configured.

As another example, EH UE 104 may have a threshold discharging rate when performing one or more communication tasks during an active period. If the actual discharging rate or a predicted discharging rate (e.g., taking into account battery leakage, energy leakage, communication schedule on UL, DL, and/or sidelink) for performing the one or more communication is higher than the threshold discharging rate, EH UE 104 may send an energy request indication and a corresponding energy request report to BS 102 requesting a higher transfer power and/or more time to harvest energy than is currently configured.

As another example, if a current energy level or a predicted energy level of EH UE 104 is insufficient to perform one or more communication tasks, EH UE 104 may send an energy request indication and a corresponding energy request report to BS 102 requesting a higher transfer power and/or more time to harvest energy than currently configured.

As another example, if a data arrival rate at EH UE 104 is greater than a threshold data arrival rate, such that EH UE 104 does not or is predicted not to have sufficient energy to receive and decode the data, EH UE 104 may send an energy request indication and a corresponding energy request report to BS 102 requesting a higher transfer power and/or more time to harvest energy than currently configured.

In certain aspects, BS 102 may transmit information indicating the threshold charging rate, threshold discharging rate, and/or threshold data arrival rate to EH UE 104 using L1, L2, and/or L3 signaling, such as per ERO or per session with the UE.

In certain aspects, EH UE 104 is configured to send the energy request report multiplexed with a buffer status report (BSR), such as with a next in time BSR reported after the ERO in which EH UE 104 transmits the energy request indication.

In certain aspects, EH UE 104 is configured to send the energy request report multiplexed with a PUSCH (e.g., scheduled PUSCH or granted PUSCH indicated to EH UE 104 by BS 102 using one or more of L1, L2, or L3 signaling), such as with a next in time PUSCH after the ERO in which EH UE 104 transmits the energy request indication.

In certain aspects, EH UE 104 is configured to send the energy request report in a MAC-CE. In certain aspects, EH UE 104 is configured to send the energy request report in a PUSCH. In certain aspects, EH UE 104 is configured to send the energy request report in a PUCCH. In certain aspects, EH UE 104 is configured to send the energy request report multiplexed with another suitable uplink resource. Multiplexing the energy request report with another signal helps save on resources used for communication.

In certain aspects, each ERO is associated with a set of parameters including one or more of a slot format, a number of bits for communication (e.g., UL, downlink, and/or sidelink), a TB size for communication, or a number of energy units for communicating and includes information based on (associated with) the set of parameters. Accordingly, in certain aspects, an energy request report associated with such an ERO may indicate a requested time for energy harvesting, a requested amount of energy for transfer, and/or the like, for performing communication according to the set of parameters. Such configuration may reduce the number of resources needed to send an energy request report, as neither the energy request report nor the ERO itself need to include an indication of the set of parameters. For example, if the ERO is associated with a first slot format, and EH UE 104 sends an energy request indication in the ERO, the EH UE 104 may transmit an energy request report indicating requested time for energy harvesting, a requested amount of energy for transfer, and/or the like, for communicating according to the first slot format. As another example, if the ERO is associated with a number of bits for communication, and EH UE 104 sends an energy request indication in the ERO, the EH UE 104 may transmit an energy request report indicating requested time for energy harvesting, a requested amount of energy for transfer, and/or the like, for communicating the number of bits. As another example, if the ERO is associated with a TB size for communication, and EH UE 104 sends an energy request indication in the ERO, the EH UE 104 may transmit an energy request report indicating requested time for energy harvesting, a requested amount of energy for transfer, and/or the like, for communicating according to the TB size. As another example, if the ERO is associated with a number of energy units, and EH UE 104 sends an energy request indication in the ERO, the EH UE 104 may transmit an energy request report indicating requested time for energy harvesting, a requested amount of energy for transfer, and/or the like, for harvesting the number of energy units.

In certain aspects, the energy request report includes an indication for the BS 102 to increase a power level of power transfer (e.g., to meet a threshold charging rate) to EH UE 104.

In certain aspects, the energy request report includes an indication of a minimum charging rate for EH UE 104.

In certain aspects, the energy request report includes an indication of a first time period for harvesting energy by EH UE 104 for EH UE 104 to communicate according to a first slot format. For example, BS 102 may accordingly configure an EH time period of an EH cycle to have a duration of the first time period.

In certain aspects, the energy request report includes an indication of a first charging rate (e.g., an amount to increase or decrease a current charging rate) for harvesting energy by EH UE 104 for EH UE 104 to communicate according to the first slot format.

In certain aspects, the energy request report includes an indication of a first energy harvesting cycle configuration for EH UE 104 to harvest energy for communicating according to the first slot format. For example, BS 102 may indicate (e.g., using L1, L2, and/or L3 signaling) to EH UE 104 a plurality of different available energy harvesting cycle configurations, each configuration corresponding to a particular active time period and a particular EH time period. Accordingly, the energy request report includes an identifier (e.g., index) of one of the plurality of available energy harvesting cycle configurations.

In certain aspects, the energy request report includes an indication of a first number of energy units estimated to be consumed by EH UE 104 for communicating according to the first slot format. In certain aspects, a size of an energy unit is predefined/preconfigured at EH UE 104. In certain aspects, an indication of the size of an energy unit is sent to EH UE 104 from BS 102, such as using L1, L2, and/or L3 signaling, in a WUI, and/or the like. In certain aspects, EH UE 104 sends an indication of the size of an energy unit to BS 102 in the energy request indication.

In certain aspects, the energy request report includes an indication of a second time period for harvesting energy for communicating according to a second slot format.

In certain aspects, the energy request report includes an indication of a second charging rate for harvesting energy for communicating according to the second slot format.

In certain aspects, the energy request report includes an indication of a second energy harvesting cycle configuration for harvesting energy for communicating according to the second slot format.

In certain aspects, the energy request report includes an indication of a second number of energy units for communicating according to the second slot format.

In certain aspects, the energy request report includes an indication of charging rate, discharging rate, energy units, energy harvesting cycle configuration and/or the like, such as for performing each configured type of communication task, such as according to each slot format defined for EH UE 104, or certain slot formats as selected by EH UE 104 and/or BS 102. In certain aspects, an indication of which slot formats for which EH UE 104 sends information in the energy request report is sent from BS 102 to EH UE 104 or from EH UE 104 to BS 102. For example, BS 102 may send an indication of available slot formats to EH UE 104, such as using one or more of L1, L2, or L3 signaling, and which slot formats for which EH UE 104 sends information are selected from the available slot formats. In certain aspects, EH UE 104 selects or requests from BS 102 (e.g., using L1, L2, and/or L3 signaling) slot formats for both UL, DL, and/or sidelink communications. In certain aspects, BS 102 selects slot formats for both UL, DL, and/or sidelink communications. In certain aspects, BS 102 selects slot formats for DL communications while EH UE 104 selects or requests slot formats for UL communications.

In certain aspects, the energy request report includes an indication of a third number of energy units estimated by EH UE 104 for processing a first number of bits or TBs at least one of: communicated using a first number of resource elements, communicated using a first slot format, communicated with a first demodulation reference signal, communicated with a first modulation coding scheme, including a first number of data bits, or including a first number of control bits.

In certain aspects, the energy request report includes an indication of a fourth number of energy units for processing a second number of bits or TBs at least one of: communicated using a second number of resource elements, communicated using a second slot format, communicated with a second demodulation reference signal, communicated with a second modulation coding scheme, including a second number of data bits, or including a second number of control bits.

In certain aspects, the energy request report includes an indication of a power level used by EH UE 104 for communication.

In certain aspects, the energy request report includes an indication of a transmit and/or receive configuration (e.g., DRX cycle configuration, DTX cycle configuration, communications cycle configuration, slot format, MCS, and/or the like) for the EH UE 104 to use to transmit and/or receive signals, and the energy request report includes a request for energy to communicate according to the transmit and/or receive configuration.

In certain aspects, BS 102 sends an indication (e.g., using L1, L2, and/or L3 signaling) to EH UE 104 of one or more communication parameters, such as a number of REs, an MCS, a number of data bits, a number of control bits, and/or the like, and the energy request report includes an indication of an estimated number of energy units to communicate according to the one or more communication parameters. In certain aspects, EH UE 104 selects the one or more communication parameters and sends an indication of the one or more communication parameters to BS 102 (e.g., using L1, L2, and/or L3 signaling).

In certain aspects, BS 102 sends an indication of an amount of data, such as for a UL, DL, and/or sidelink communication, to EH UE 104. For example BS 102 may send a DL BSR to EH UE 104 and an indication of a TB size. Accordingly, EH UE 104 may send an energy request report to EH UE 104 that indicates an amount of time estimated for harvesting energy to communicate the amount of data.

Aspects Related to Energy Reporting

As discussed, certain aspects herein provide techniques for an EH UE 104 to send an energy report to the network node. In certain aspects, the energy report indicates, to the network node, at least one communication capability of the UE based on an energy level of the UE (e.g., a current energy level of the UE or a future predicted energy level of the UE). For example, the UE may have different communication capabilities for different energy levels. In certain aspects, a UE can predict a future predicted energy level by taking into account scheduled communications and scheduled energy harvesting periods for the UE. The UE may estimate a power consumption for each of the scheduled communications, and estimate an amount of energy harvested during each scheduled energy harvesting period, prior to the time period for which the future predicted energy level is predicted.

In certain aspects, EH UE 104 is configured to send an energy report indication in an energy report occasion to BS 102. The energy report indication indicates a request by the EH UE 104 to send the energy report to the BS 102. Accordingly, after transmitting the energy report indication in the energy report occasion, EH UE 104 is configured to transmit the energy report to the BS 102. In certain aspects, EH UE 104 is configured to transmit the energy report indication in an energy report occasion when one or more conditions are met, as discussed further herein. In certain aspects, EH UE 104 is configured to refrain from transmitting the energy report indication in an energy report occasion when one or more conditions are not met, as discussed further herein.

Figure 9:
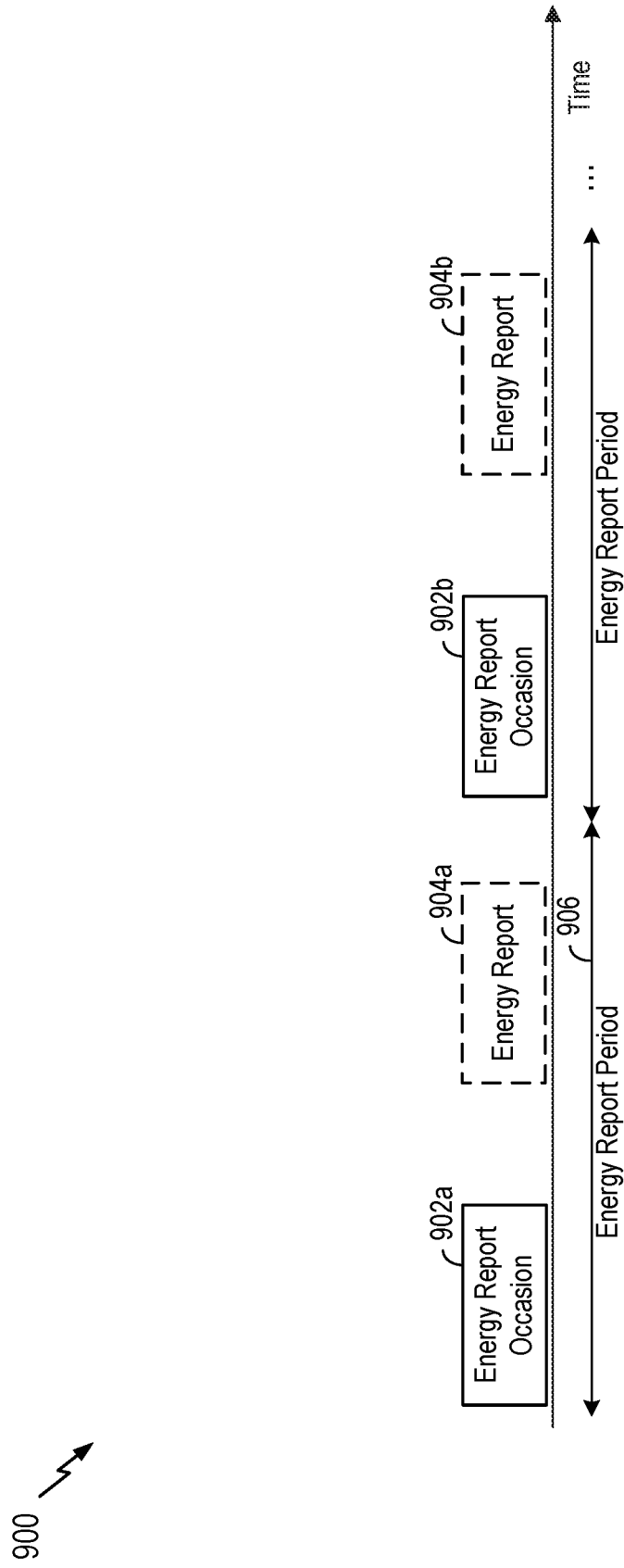
FIG. 9 illustrates an example timeline for energy reporting.

FIG. 9 illustrates an example timeline 900 for energy reporting. As shown, energy report periods 906 may occur periodically in time. Each energy report period may include one or more energy report occasions 902, shown as energy report occasion 902a for a first energy report period and energy report occasion 902b for a second energy report period. As discussed, if EH UE 104 transmits an energy report indication in an energy report occasion, EH UE 104 is configured to transmit an energy report 904 in the energy report period after transmitting the energy report indication. An energy report is considered associated with an energy report occasion when the energy report is transmitted in response to transmission of an energy report indication in the energy report occasion. For example, where EH UE 104 transmits an energy report indication in energy report occasion 902a, EH UE 104 further transmits an energy report 904a. Further, where EH UE 104 transmits an energy report indication in energy report occasion 902b, EH UE 104 further transmits an energy report 904b.

In certain aspects, the resources (e.g., time-frequency resources, such as RBs, REs, and/or other spatial resources) used by EH UE 104 to transmit an energy report can be indicated to BS 102 by the energy report indication transmitted prior to transmitting the energy report. For example, the energy report indication may include a sequence of bits, and different sequences may map to different resources.

In certain aspects, EH UE 104 is configured by BS 102 with one or more energy report occasions, such as using one or more of L1, L2, or L3 signaling. For example, each energy report occasion may span one or more resources in time and frequency. The one or more resources of an energy report occasion may or may not be contiguous. The BS 102 indicates which resources one or more energy report occasions occupy (e.g., which periodic resources). In certain aspects, different energy report occasions may be associated with different wireless transfer technologies (e.g., RF power transfer from BS 102 to EH UE 104, laser power transfer from BS 102 to EH UE 104, and/or the like). By associating different energy report occasions with different wireless transfer technologies, in some cases, EH UEs that support multiple types of wireless power transfer can advantageously be supported.

For example, in certain aspects, EH UE 104 is configured to receive an indication of a periodicity of energy report occasions from BS 102, such as using one or more of L1, L2, or L3 signaling. BS 102 may further later send an indication of an updated periodicity of energy report occasions to EH UE 104, such as based on information (e.g., charging rate, discharging rate, energy level, and/or the like of EH UE 104) received in one or more energy reports from EH UE 104. For example, a higher discharging rate, lower charging rate and/or lower energy level may lead to an increased periodicity, while a lower discharging rate, higher charging rate, and/or higher energy level may lead to a decreased periodicity. In certain aspects, an initial periodicity of energy report occasions is based on a device class of EH UE 104, which may correlate to a nominal or expected charging and/or discharging rate. For example, different device classes may be associated with different initial periodicities. In certain aspects, EH UE 104 sends an indication of its device class to BS 102, such as using one or more of L1, L2, or L3 signaling. In certain aspects, EH UE 104 may indicate a requested periodicity of energy report occasions to BS 102, such as using one or more of L1, L2, or L3 signaling (e.g., multiplexed with other signals or not).

In certain aspects, EH UE 104 is configured to transmit an energy report indication in an energy report occasion when one or more conditions are met. The one or more conditions may include one or more of: a charging rate of the UE having changed by a first threshold from a previously reported charging rate; a discharging rate of the UE having changed by a second threshold from a previously reported discharging rate; a change in energy level of the UE by a threshold from a previously reported energy level; or a data arrival rate at the UE.

For example, if a data arrival rate at EH UE 104, such as corresponding to a number of buffered bits or TBs at BS 102 for transmission to EH UE 104, exceeds a threshold, where that threshold takes into account a charging rate and/or discharging rate of EH UE 104, then EH UE 104 may send the energy report indication. As another example, if the charging rate is below a threshold and/or discharging rate is above a threshold at EH UE 104, and the data arrival rate is above a threshold, then EH UE 104 may send the energy report indication.

In certain aspects, any change of charging rate, discharging rate, and/or energy level at EH UE 104 may cause EH UE 104 to send the energy report indication.

In certain aspects, BS 102 may transmit information indicating the threshold change in charging rate, threshold change in discharging rate, and/or threshold data arrival rate to EH UE 104 using L1, L2, and/or L3 signaling, such as per energy report occasion or per communication session with the UE.

In certain aspects, EH UE 104 is configured to send the energy report multiplexed with a BSR, such as with a next in time BSR reported after the energy report occasion in which EH UE 104 transmits the energy report indication.

In certain aspects, EH UE 104 is configured to send the energy report multiplexed with a PUSCH (e.g., scheduled PUSCH or granted PUSCH indicated to EH UE 104 by BS 102 using one or more of L1, L2, or L3 signaling), such as with a next in time PUSCH after the energy report occasion in which EH UE 104 transmits the energy report indication.

In certain aspects, EH UE 104 is configured to send the energy report in one or more of a MAC-CE, a PUSCH, a PUCCH, or multiplexed with another suitable uplink resource. Multiplexing the energy report with another signal helps save on resources used for communication.

In certain aspects, EH UE 104 is configured to send the energy report in a same time resource (e.g., slot, symbol, etc.) as an energy request report, but in different frequency resources (e.g., RBs, REs, subcarriers, etc.). In certain aspects, EH UE 104 is configured to send the energy report in a same frequency resource as an energy request report, but in different time resources. For example, in certain aspects, EH UE 104 is configured to multiplex the energy report with the energy request report (e.g., before or after encoding the energy report and the energy request report in the bit domain).

In certain aspects, EH UE 104 is configured to send the energy report indication in a same time resource (e.g., slot, symbol, etc.) as an energy request indication, but in different frequency resources (e.g., RBs, REs, subcarriers, etc.). In certain aspects, EH UE 104 is configured to send the energy report indication in a same frequency resource as an energy request indication, but in different time resources. For example, in certain aspects, EH UE 104 is configured to multiplex the energy report indication with the energy request indication (e.g., before or after encoding the energy report indication and the energy request indication in the bit domain).

In certain aspects, BS 102 is configured to send a DL BSR to EH UE 104 and information indicating a certain TB size. In certain aspects, the EH UE 104 is configured to send, in response, an energy report or energy request based on the DL BSR and TB size, such as to harvest energy to receive data from the DL BSR according to the TB size. In certain aspects, the energy report or energy request indicates a charging rate for the EH UE 104. In certain aspects, EH UE 104 sends to BS 102 information indicative of an expected amount of harvesting time for a communication task.

In certain aspects, when resources of an energy request occasion (ERO) overlap with resources of an energy report occasion (e.g., in frequency and time), such as completely or partially, EH UE 104 may be configured to use only the resources of one of the ERO or the energy report occasion to correspondingly send an energy request indication or an energy report indication. For example, EH UE 104 may be configured, such as preconfigured or by receiving an indication from BS 102 (e.g., using L1, L2, and/or L3 signaling), with a priority between EROs and energy report occasions. Accordingly, when resources of an ERO overlap with resources of an energy report occasion, the EH UE 104 uses the resources as either an ERO if ERO has higher priority than energy report occasion, or an energy report occasion if energy report occasion has a higher priority than ERO.

In certain aspects, when resources of an ERO overlap with resources of an energy report occasion (e.g., in frequency and time), such as completely or partially, EH UE 104 may be configured to multiplex an energy report indication with an energy request indication. In certain aspects, the EH UE 104 is configured to multiplex the energy report indication and the energy request indication using the bit level versions of the indications or after encoding the indications on different time-frequency resources.

In certain aspects, each energy report occasion is associated with a set of parameters including one or more of a slot format, an MCS, and/or a transmit power. Accordingly, in certain aspects, an energy report associated with such an energy report occasion may indicate a number of communications, bits, and/or TBs the EH UE 104 can communicate (e.g., transmit or receive) when communicating according to the set of parameters, such as using the slot format, MCS, and/or transmit power.

For example, if the energy report occasion is associated with a first slot format, and EH UE 104 sends an energy report indication in the energy report occasion, then EH UE 104 may transmit an energy report indicating a number of slots, bits, and/or TBs the EH UE 104 can communicate using the first slot format based on a current or future predicted power level of EH UE 104. As another example, if the energy report occasion is associated with a first MCS, and EH UE 104 sends an energy report indication in the energy report occasion, then EH UE 104 may transmit an energy report indicating a number of slots, bits, and/or TBs the EH UE 104 can communicate using the first MCS based on a current or future predicted power level of EH UE 104. As another example, if the energy report occasion is associated with a first transmit power, and EH UE 104 sends an energy report indication in the energy report occasion, then EH UE 104 may transmit an energy report indicating a number of slots, bits, and/or TBs the EH UE 104 can transmit using the first transmit power based on a current or future predicted power level of EH UE 104.

As discussed, in certain aspects, the energy report indicates, to BS 102, at least one communication capability of the EH UE 104 based on an energy level of the EH UE 104 (e.g., a current energy level of the EH UE 104 or a future predicted energy level of the EH UE 104).

In certain aspects, the at least one communication capability includes a first number of bits or TBs the UE can decode when one or more of communicated using a first number of resource elements, communicated using a first slot format, communicated with a first demodulation reference signal, communicated with a first modulation coding scheme, including a first number of data bits, or including a first number of control bits.

In certain aspects, the at least one communication capability includes a first number of control signals the UE can decode, such as of a certain format (e.g., DCI format).

In certain aspects, the at least one communication capability includes a second number of bits or TBs the UE can communicate when one or more of communicated using a second number of resource elements, communicated using a second slot format, communicated with a second demodulation reference signal, communicated with a second modulation coding scheme, including a second number of data bits, or including a second number of control bits, and when using a first transmit power. In certain aspects, BS 102 sends an indication to EH UE 104 (e.g., using L1, L2, and/or L3 signaling) of one or more transmit power levels that EH UE 104 can use to transmit. In certain aspects, the first transmit power is selected by EH UE 104 from the one or more transmit power levels. In certain aspects, BS 102 sends an indication of the first transmit power (e.g., using L1, L2, and/or L3 signaling) of the one or more transmit power levels to EH UE 104.

In certain aspects, the at least one communication capability includes a third number of bits or TBs the UE can communicate when one or more of communicated using the second number of resource elements, communicated using the second slot format, communicated with the second demodulation reference signal, communicated with the second modulation coding scheme, including the second number of data bits, or including the second number of control bits, and when using a second transmit power. In certain aspects, the second transmit power is selected by EH UE 104 from the one or more transmit power levels. In certain aspects, BS 102 sends an indication of the second transmit power (e.g., using L1, L2, and/or L3 signaling) of the one or more transmit power levels to EH UE 104.

In certain aspects, the at least one communication capability includes a second number of control signals (e.g., uplink control information (UCI)) that the UE can transmit when using a third transmit power. In certain aspects, the third transmit power is selected by EH UE 104 from the one or more transmit power levels. In certain aspects, BS 102 sends an indication of the third transmit power (e.g., using L1, L2, and/or L3 signaling) of the one or more transmit power levels to EH UE 104.

In certain aspects, the at least one communication capability includes a third number of control signals that the UE can transmit when using a fourth transmit power. In certain aspects, the fourth transmit power is selected by EH UE 104 from the one or more transmit power levels. In certain aspects, BS 102 sends an indication of the fourth transmit power (e.g., using L1, L2, and/or L3 signaling) of the one or more transmit power levels to EH UE 104.

In certain aspects, the at least one communication capability includes a number of communications the UE can handle for each of one or more slot formats (e.g., when using one or more TB sizes, MCS, and/or the like). In certain aspects, an indication of which slot formats for which EH UE 104 sends information in the energy report is sent from BS 102 to EH UE 104 or from EH UE 104 to BS 102. For example, BS 102 may send an indication of available slot formats to EH UE 104, such as using one or more of L1, L2, or L3 signaling, and which slot formats for which EH UE 104 sends information are selected from the available slot formats. In certain aspects, EH UE 104 selects or requests from BS 102 (e.g., using L1, L2, and/or L3 signaling) slot formats for both UL, DL, and/or sidelink communications. In certain aspects, BS 102 selects slot formats for both UL, DL, and/or sidelink communications. In certain aspects, BS 102 selects slot formats for DL communications while EH UE 104 selects or requests slot formats for UL communications.

In certain aspects, the at least one communication capability includes a number of communications (e.g., in terms of bits, TBs, time, slot formats), such as data, RS, control signals, and/or the like, the UE can transmit or receive when operating according to a particular EH cycle configuration and/or DRX, DTX, and/or communications cycle configuration.

In certain aspects, EH UE 104 is configured to include in the energy report, information related to time. For example, EH UE 104 indicates whether the at least one communication capability is associated with a current power level of EH UE 104 at a current time period, or a future predicted power level of EH UE 104 at one or more future time periods (e.g., T1, T2, T3, etc.). In certain aspects, the time periods are defined as a number of time units from a reference time, such as a current time. The number of time units may be, for example, a number of EH cycles, a number of EH time periods, a number of milliseconds, and/or the like. In certain aspects, the energy report includes at least one communication capability for each of multiple time periods. For example, the energy report may indicate a number of communications the UE is estimated to have power to transmit at each of a current time period and one or more future time periods.

In certain aspects, BS 102 sends an indication of one or more time periods for which EH UE 104 should include communication capability information in the energy report, such as using L1, L2, and/or L3 signaling. In certain aspects, an energy report occasion may be associated with one or more time periods, and different energy report occasions may be associated with different one or more time periods. Accordingly, when EH UE 104 transmits an energy report indication in an energy report occasion, EH UE 104 sends an energy report including at least one communication capability for each of the one or more time periods associated with the energy report occasion.

In certain aspects, BS 102 sends an indication (e.g., using L1, L2, and/or L3 signaling) to EH UE 104 of one or more communication parameters, such as a number of REs, an MCS, a number of data bits, a number of control bits, a number of time-frequency blocks, a transmit power level, a DMRS configuration, a cycle configuration for communication, and/or the like. Accordingly, in certain aspects, EH UE 104 is configured to include in the energy report an indication of an estimated number of communications the EH UE 104 can perform according to one or more combinations of the one or more communication parameters. In certain aspects, EH UE 104 selects the one or more communication parameters to use for communication and sends an indication of the one or more communication parameters to BS 102 (e.g., using L1, L2, and/or L3 signaling).

Aspects Related to Energy Request Reports and Energy Reports for RF EH UEs

As discussed above with respect to FIGS. 5A-5C, an RF EH UE may use different architectures, such as a time switching architecture or a power splitting architecture (e.g., 500b or 500c).

In certain aspects, where EH UE 104 uses a power splitting architecture, the received signal power of a signal received at an antenna of EH UE 104 is split according to a power ratio (p) between the EH circuit and the transceiver. Accordingly, the power ratio may be a ratio between using the received signal power for energy harvesting (e.g., used as the numerator) and using the received signal power for data reception (e.g., used as the denominator). In certain aspects, the power ratio used at EH UE 104 is configurable, e.g., such that different proportions of power can be configured for energy harvesting and for data reception and processing. For example, in certain aspects, EH UE 104 is configured to change the power ratio used, such as increase the power ratio when EH UE 104 has insufficient power to perform one or more communication tasks and/or when the signal quality (e.g., signal to noise ratio (SNR)) is above a threshold. In certain aspects, EH UE 104 is configured to decrease the power ratio when EH UE 104 has sufficient power to perform one or more communication tasks and/or when the signal quality (e.g., signal to noise ratio (SNR)) is below a threshold. In certain aspects, BS 102 is configured to send an indication of a power ratio to EH UE 104, and the EH UE 104 uses the indicated power ratio. For example, BS 102 may send the indication of the power ratio using L1, L2, and/or L3 signaling, such as in a scheduling DCI or non-scheduling DCI used to trigger EH UE 104 to transmit an energy request report or an energy report, and/or the like.

In certain aspects, information included in the energy request report and/or energy report is further based on one or more power ratios for EH UE 104. For example, in certain aspects, a particular ERO or energy report occasion may be associated with a particular one or more power ratios (e.g., preconfigured), and therefore the associated energy request report or energy report includes information based on the particular one or more power ratios. In another example, BS 102 may send the indication of the one or more power ratios to use for one or more energy request reports and/or one or more energy reports using L1, L2, and/or L3 signaling, such as in a scheduling DCI or non-scheduling DCI used to trigger EH UE 104 to transmit an energy request report or an energy report, and/or the like.

In certain aspects, for each of the one or more power ratios, information included in an energy request report based on the power ratio may include an indication of one or more charging parameters when using the power ratio, such as one or more of: an indication of an amount of energy units EH UE 104 can harvest during a time period (e.g., an EH time period) when using the power ratio, an indication of a charging rate of EH UE 104 when using the power ratio, an indication of a discharging rate of EH UE 104 when using the power ratio, an indication of a power level to use for communication when using the power ratio, an indication of a time period for harvesting energy when using the power ratio, an indication of a power level for power transfer by BS 102 when using the power ratio, an indication of an EH cycle configuration when using the power ratio, and/or an indication of one or more other charging parameters of EH UE 104 when using the power ratio.

In certain aspects, for each of the one or more power ratios, information included in an energy report based on the respective power ratio may include one or more of the communication capabilities discussed herein when using the power ratio, such as: a first number of bits or TBs the EH UE 104 can decode when using the power ratio and when one or more of communicated using a first number of resource elements, communicated using a first slot format, communicated with a first demodulation reference signal, communicated with a first modulation coding scheme, including a first number of data bits, or including a first number of control bits; a first number of control signals the EH UE 104 can decode, such as of a certain format (e.g., DCI format), when using the power ratio; a second number of bits or TBs the EH UE 104 can communicate when using the power ratio and when one or more of communicated using a second number of resource elements, communicated using a second slot format, communicated with a second demodulation reference signal, communicated with a second modulation coding scheme, including a second number of data bits, or including a second number of control bits, and when using a first transmit power; and/or a second number of control signals (e.g., uplink control information (UCI)) the EH UE 104 can transmit using a third transmit power when using the power ratio.

In certain aspects, where EH UE 104 uses a time switching architecture (e.g., 500*b* of FIG. 5B), the signal received at an antenna of EH UE 104 is switched in time according to a time ratio (t) between being sent to the EH circuit and the transceiver, as discussed. Accordingly, the time ratio may be a ratio between an amount of time the received signal is used for energy harvesting (e.g., used as the numerator) and an amount of time the received signal is used for data reception (e.g., used as the denominator). In certain aspects, the time ratio used at EH UE 104 is configurable e.g., such that different proportions of time can be configured for energy harvesting and for data reception and processing. For example, in certain aspects, EH UE 104 is configured to change the time ratio used, such as increase the time ratio when EH UE 104 has insufficient power to perform one or more communication tasks and/or when the signal quality (e.g., SNR) is above a threshold. In certain aspects, EH UE 104 is configured to decrease the time ratio when EH UE 104 has sufficient power to perform one or more communication tasks and/or when the signal quality (e.g., SNR) is below a threshold. In certain aspects, BS 102 is configured to send an indication of a time ratio to EH UE 104, and the EH UE 104 uses the indicated time ratio. For example, BS 102 may send the indication of the time ratio using L1, L2, and/or L3 signaling, such as in a scheduling DCI or non-scheduling DCI used to trigger EH UE 104 to transmit an energy request report or an energy report, and/or the like.

In certain aspects, information included in the energy request report and/or energy report is further based on one or more time ratios for EH UE 104. For example, in certain aspects, a particular ERO or energy report occasion may be associated with a particular one or more time ratios, and therefore the associated energy request report or energy report includes information based on the particular one or more time ratios. In another example, BS 102 may send the indication of the one or more time ratios to use for one or more energy request reports and/or one or more energy reports using L1, L2, and/or L3 signaling, such as in a scheduling DCI or non-scheduling DCI used to trigger EH UE 104 to transmit an energy request report or an energy report, and/or the like.

In certain aspects, for each of the one or more time ratios, information included in an energy request report based on the time ratio may include an indication of one or more charging parameters when using the time ratio, such as one or more of: an indication of an amount of energy units EH UE 104 can harvest during a time period (e.g., an EH time period) when using the time ratio, an indication of a charging rate of EH UE 104 when using the time ratio, an indication of a discharging rate of EH UE 104 when using the time ratio, an indication of a power level to use for communication when using the time ratio, an indication of a time period for harvesting energy when using the time ratio, an indication of a power level for power transfer by BS 102 when using the time ratio, an indication of an EH cycle configuration when using the time ratio, and/or an indication of one or more other charging parameters of EH UE 104 when using the time ratio.

In certain aspects, for each of the one or more time ratios, information included in an energy report based on the time ratio may include one or more of the communication capabilities discussed herein when using the time ratio, such as: a first number of bits or TBs the EH UE 104 can decode when using the time ratio and when one or more of communicated using a first number of resource elements, communicated using a first slot format, communicated with a first demodulation reference signal, communicated with a first modulation coding scheme, including a first number of data bits, or including a first number of control bits; a first number of control signals the EH UE 104 can decode, such as of a certain format (e.g., DCI format), when using the time ratio; a second number of bits or TBs the EH UE 104 can communicate when using the time ratio and when one or more of communicated using a second number of resource elements, communicated using a second slot format, communicated with a second demodulation reference signal, communicated with a second modulation coding scheme, including a second number of data bits, or including a second number of control bits, and when using a first transmit power; and/or a second number of control signals (e.g., uplink control information (UCI)) the EH UE 104 can transmit using a third transmit power when using the time ratio.

Additional Considerations

In certain aspects, an energy request report and/or energy report sent by EH UE 104 includes one or more of: an indication of a requested time for energy harvesting, an indication of a requested EH cycle configuration, and/or the like to achieve a threshold charging rate at EH UE 104. In certain aspects, the threshold charging rate is indicated to the EH UE 104 and/or based on (e.g., as mapped to) a slot format, data rate, power control for uplink, and/or the like used for communication by EH UE 104.

In certain aspects, an energy request report and/or energy report sent by EH UE 104 includes an EH cycle configuration based on (e.g., as mapped to) a type of energy harvesting performed by EH UE 104 (e.g., a type of RF EH, such as based on what types of signals are used for energy harvesting, what frequency band of signals are used for energy harvesting, etc.). In certain aspects, if EH UE 104 uses RF signals in a first frequency band for EH and communicates RF signals in a different second frequency band, EH UE 104 may require time for tuning an RF circuit between the different frequency bands when switching between EH and communicating signals. Accordingly, an EH cycle configuration may include a gap period between an active time period and an EH time period to allow for EH UE 104 to tune the RF circuit. Similarly, an EH cycle configuration may include a gap period between an active time period and an EH time period to allow for EH UE 104 to switch a time switcher when using a time switching architecture.

In certain aspects, at least one of the energy request report or the energy report comprises a table comprising a plurality of fields each having a predetermined size in bits, wherein values in each of the plurality of fields is quantized. For example, each entry in the table of an energy request report may indicate a charging parameter and associated value. As another example, each entry in the table of an energy report may indicate a communication capability and associated value. In certain aspects, EH UE 104 communicates at least one of the energy request report or the energy report using RRC signaling, MAC-CE, DCI, and/or other L1, L2, or L3 signaling.

For example, assuming the energy request report includes a charging rate requirement for each of four slot formats, the energy request report table may include four entries, one for each slot format. Each entry may include a value indicating one of the slot formats using two bits (e.g., 00, 10, 01, or 11). Further, each entry may include a value indicating a charging rate associated with the slot format. For example, assuming 16 quantization levels of the charging rate, 4 bits may be used for each entry to indicate a quantized charging rate associated with the slot format associated with the entry. For example, assume slot format 00 is associated with a charging rate 0011 and slot format 01 is associated with a charging rate 0100.

In certain aspects, the energy request report includes entries arranged as a first indication of the slot format followed by the indicated charging rate, a second indication of the slot format followed by the indicated charging rate, etc. For example, to indicate the charging rates of slot formats 00 and 01, the energy request report includes entries arranged as 00 0011 01 0100.

In certain aspects, the energy request report includes entries arranged as all indications of slot formats followed by all indications of associated charging rates in order. For example, to indicate the charging rates of slot formats 00 and 01, the energy request report includes entries arranged as 00 01 0011 0100.

In certain aspects, the energy request report only indicates charging rates for all configured slot formats in an order that is predefined or indicated to EH UE 104 by BS 102 using one or more of L1, L2, or L3 signaling. For example, where the defined order of slot formats is 00 01, the energy request report includes entries arranged as 0011 0100.

In certain aspects, a first link or interface may be used for communicating energy request indications, energy request reports, energy report indications, energy reports, and/or other communications. In certain aspects, the first interface may be composed of a communication system that may use a sinewave (single tone) or multi-tone (OFDM-based) waveform (RF waveforms) transmitted by a first device and reflected/backscattered by a (second device) EH UE. The first device may refer to a network entity or a UE (e.g., a sidelink UE (remote, primary, programmable logic controller (PLC), or a controlling unit in sidelink), or a Uu link UE). The waveform generated by the first device may carry a data signal (e.g., PDSCH, PDSCH, PSSCH, among other examples), reference signal (e.g., CSI-RS, SRS, SSB, among other examples), or random data or reference signal signals/symbols across different sub-channels/REs. In some examples, the waveform may be a sub-channel modulated OFDM signal/waveform or time-domain modulated OFDM-based signal/waveform. The communication signals in the first interface may refer to a modulated waveform/signal generated by the EH UE, according to what the EH UE is capable of generating, wherein the waveform can be one of a sinewave (single tone) or multi-tone wave (e.g., OFDM-based waveform). In some examples, the modulation used can be on-off keying (OOK), amplitude-shift keying (ASK), frequency-shift keying (FSK), phase-shift keying (PSK), Zadoff Chu, discrete Fourier transform (DFT), Walshi/Hadamard, Gold, Reed-Solomon, m-sequence, Chirp, among other examples. In some examples, modulation may occur in the time domain or frequency domain or jointly. In some examples, Manchester coding may be used with ASK or OOK. In some example, forward error correction codes and other channel coding may be applied to achieve higher reliability.

In some aspects, a UE may use two different interfaces wherein one (first) interface is associated with high power mode (or no to low power saving mode). The first interface may be associated with a Uu or PC5 like interface. The other (second) interface may be associated with same radio as the first interface with deactivation of one or more components or with a separate radio (e.g., backscatter-based or radio similar to a tag (e.g., passive or semi-passive)). The second interface may be used with low to very low power saving modes, such as wherein a UE is maximizing power saving. In either case, the UE may send energy request indications, energy request reports, energy report indications, and/or energy reports using the backscatter-based mode or the first interface by generating simple OFDM-based or single-tone based modulated signals (e.g., OFDM-based OOK or single-tone based OOK). In some aspects, a certain interface may be used for a certain type of signal. For example, if the signal is low priority or less important than data and regular UL signals (e.g., HARQ-ACK, CSI report, etc.), the second interface may be used. If the signal is important (e.g., data), the first interface may be used. In some cases, a network entity can assign different signals to different interfaces based on (e.g., as mapped to) priority, QoS requirements, and/or for power savings at the network and/or a UE. In some cases, network entity can assign different signals to different interfaces based on information included in the energy request report and/or the energy report. In some cases, network entity can assign different signals to different interfaces based on (e.g., as mapped to) UE preference and traffic. For example, the UE can send to a network entity an indication of a particular mapping between signals and interfaces, such as using one or more of L1, L2, or L3 signaling. The indication of the mapping can be sent as dedicated signaling or multiplexed with other signals. The network entity can configure the UE with the mapping between signals and interfaces, such as using one or more of L1, L2, or L3 signaling.

Example Operations of a User Equipment

Figure 10:
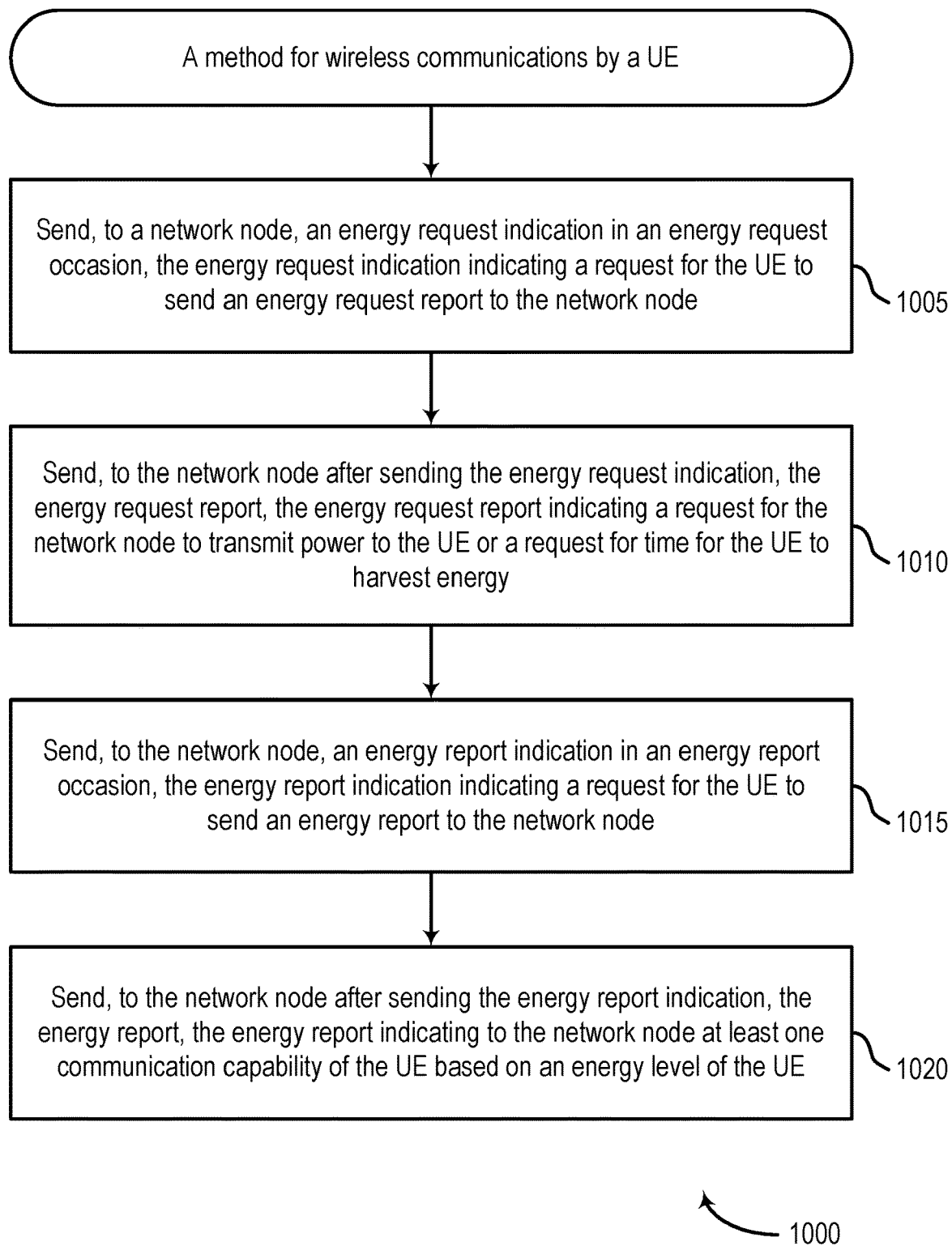
FIG. 10 depicts a method for wireless communications.

FIG. 10 shows a method 1000 for wireless communications by a UE, such as UE 104 of FIGS. 1 and 3.

Method 1000 begins at step 1005 with sending, to a network node, an energy request indication in an energy request occasion, the energy request indication indicating a request for the UE to send an energy request report to the network node. For example, as discussed with respect to FIG. 8, an EH UE 104 is configured to send an energy request indication in an ERO 802a to BS 102. The energy request indication may be a request by the EH UE 104 to the BS 102 to use resources to send an energy request report to the BS 102. For example, when an EH UE 104 has insufficient power to perform one or more communication tasks, it may send an energy request indication in an ERO. For example, EH UE 104 may have a number of bits in an UL buffer of EH UE 104 to transmit, which may be divided among one or more TBs, and therefore may request energy to transmit the bits. In another example, BS 102 may indicate to EH UE 104 that BS 102 has a number of bits in a DL buffer of BS 102 to transmit to EH UE 104.

Method 1000 then proceeds to step 1010 with sending, to the network node after sending the energy request indication, the energy request report, the energy request report indicating a request for the network node to transmit power to the UE or a request for time for the UE to harvest energy. For example, as discussed with respect to FIG. 8, an EH UE 104 is configured to send an energy request report 804a to BS 102. In certain aspects, the energy request report indicates a request for BS 102 to transmit power to EH UE 104, such as by directing a laser beam or RF signals at EH UE 104. In certain aspects, the energy request report indicates a request for time for EH UE 104 to harvest energy.

Method 1000 then proceeds to step 1015 with sending, to the network node, an energy report indication in an energy report occasion, the energy report indication indicating a request for the UE to send an energy report to the network node. For example, as discussed with respect to FIG. 9, an EH UE 104 is configured to send an energy report indication in an energy report occasion 902a to BS 102. The energy report indication may be a request by the EH UE 104 to the BS 102 to use resources to send an energy report to the BS 102. In certain aspects, EH UE 104 is configured to transmit the energy report indication in an energy report occasion when one or more conditions are met, as discussed further herein.

Method 1000 then proceeds to step 1020 with sending, to the network node after sending the energy report indication, the energy report, the energy report indicating to the network node at least one communication capability of the UE based on an energy level of the UE. For example, as discussed with respect to FIG. 9, an EH UE 104 is configured to send an energy report 904a to BS 102. In certain aspects, the energy report indicates, to the network node, at least one communication capability of the UE based on an energy level of the UE (e.g., a current energy level of the UE or a future predicted energy level of the UE). For example, the UE may have different communication capabilities for different energy levels.

In one aspect, the UE sends the energy request indication based on one or more of: a current charging rate of the UE being below a first threshold charging rate; a predicted charging rate of the UE for a first future time period being below a second threshold charging rate; a current discharging rate of the UE being above a first threshold discharging rate; a predicted discharging rate of the UE for a second future time period being above a second threshold discharging rate; a current energy level of the UE; or a data arrival rate at the UE.

In one aspect, method 1000 further includes sending at least one of the energy request report or the energy report at least one of: multiplexed with a buffer status report; in a MAC-CE; in a physical uplink shared channel; in a physical uplink control channel; or multiplexed with another uplink resource.

In one aspect, the energy request report comprises one or more of: an indication for the network node to increase a power level of power transfer; an indication of a minimum charging rate for the UE; an indication of a first time period for harvesting energy for communicating according to a first slot format; an indication of a first charging rate for harvesting energy for communicating according to the first slot format; an indication of a first energy harvesting cycle configuration for harvesting energy for communicating according to the first slot format; an indication of a first number of energy units for communicating according to the first slot format; an indication of a second time period for harvesting energy for communicating according to a second slot format; an indication of a second charging rate for harvesting energy for communicating according to the second slot format; an indication of a second energy harvesting cycle configuration for harvesting energy for communicating according to the second slot format; an indication of a second number of energy units for communicating according to the second slot format; an indication of a third number of energy units for processing a first number of bits or transport blocks at least one of: communicated using a first number of resource elements, communicated with a first demodulation reference signal, communicated with a first modulation coding scheme, including a first number of data bits, or including a first number of control bits; an indication of a fourth number of energy units for processing a second number of bits or transport blocks at least one of: communicated using a second number of resource elements, communicated with a second demodulation reference signal, communicated with a second modulation coding scheme, including a second number of data bits, or including a second number of control bits; or an indication of a power level to use for communication.

In one aspect, method 1000 further includes receiving, from the network node, an indication of a threshold charging rate, wherein the indication for the network node to increase the power level of power transfer indicates a power level associated with the threshold charging rate.

In one aspect, method 1000 further includes communicating, with the network node, an indication of at least one requested slot format for at least one of uplink, downlink, or sidelink communication, wherein the first slot format is based on the at least one requested slot format (e.g., is the at least one requested slot format).

In one aspect, method 1000 further includes communicating, with the network node, an indication of a plurality of energy harvesting cycle configurations, wherein the first energy harvesting cycle configuration is one of the plurality of energy harvesting cycle configurations.

In one aspect, method 1000 further includes communicating, with the network node, an indication of one or more of the first number of resource elements, the first modulation coding scheme, the first number of data bits, or the first number of control bits.

In one aspect, the energy request occasion is associated with a set of parameters comprising one or more of a slot format, a number of bits for communication, a transport block size for communication, or a number of energy units, and wherein information included in the energy request report is based on the set of parameters.

In one aspect, method 1000 further includes receiving, from the network node, at least one of: an indication of a periodicity of energy request occasions; or an indication of a periodicity of energy report occasions.

In one aspect, method 1000 further includes receiving, from the network node, at least one of: an indication of an updated periodicity of energy request occasions; or an indication of an updated periodicity of energy report occasions.

In one aspect, at least one of the updated periodicity of energy request occasions or the updated periodicity of energy report occasions is based on one or more of a charging rate of the UE, a discharging rate of the UE, or an energy state of the UE as indicated in the energy report.

In one aspect, method 1000 further includes communicating with the network node according to periodic discontinuous reception cycles, wherein each cycle of the periodic discontinuous reception cycles comprises an active time period where the UE is configured to monitor for signals and a sleep time period where the UE is not configured to monitor for the signals.

In one aspect, method 1000 further includes harvesting energy according to periodic energy harvesting cycles, wherein each cycle of the periodic energy harvesting cycles comprises a harvesting time period where the UE is configured to harvest energy and a non-harvesting time period where the UE is not configured to harvest energy.

In one aspect, the active time periods of the periodic discontinuous reception cycles overlap in time with the harvesting time periods of the periodic energy harvesting cycles.

In one aspect, method 1000 further includes sending the energy request indication and the energy report indication at least one of: in different frequency resources within a same time resource; or in different time resources within a same frequency resource.

In one aspect, the UE sends the energy report indication based on one or more of: a charging rate of the UE having changed by a first threshold from a previously reported charging rate; a discharging rate of the UE having changed by a second threshold from a previously reported discharging rate; a change in energy level of the UE by a threshold from a previously reported energy level; or a data arrival rate at the UE.

In one aspect, method 1000 further includes receiving, before sending the energy request report, an indication of an amount of data, wherein the energy request report indicates an amount of time to harvest energy to receive the amount of data.

In one aspect, method 1000 further includes sending only one of a second energy request indication in a second energy request occasion or a second energy report indication in a second energy report occasion when the second energy request occasion overlaps with the second energy report occasion.

In one aspect, the at least one communication capability comprises one or more of: a first number of bits or transport blocks the UE can decode when one or more of communicated using a first number of resource elements, communicated with a first demodulation reference signal, communicated with a first modulation coding scheme, including a first number of data bits, or including a first number of control bits; a first number of control signals the UE can decode; a second number of bits or transport blocks the UE can communicate when one or more of communicated using a second number of resource elements, communicated with a second demodulation reference signal, communicated with a second modulation coding scheme, including a second number of data bits, or including a second number of control bits, and when using a first transmit power; a third number of bits or transport blocks the UE can communicate when one or more of communicated using the second number of resource elements, communicated with the second demodulation reference signal, communicated with the second modulation coding scheme, including the second number of data bits, or including the second number of control bits, and when using a second transmit power; a second number of control signals the UE can transmit using a third transmit power; a third number of control signals the UE can transmit using a fourth transmit power; or a number of communications the UE can handle for each of one or more slot formats.

In one aspect, the energy level of the UE comprises a current energy level of the UE or a future predicted energy level of the UE.

In one aspect, method 1000 further includes communicating, with the network node, an indication of at least one requested slot format for at least one of uplink, downlink, or sidelink communication, wherein the one or more slot formats are based on the at least one requested slot format (e.g., is the at least one requested slot format).

In one aspect, method 1000 further includes communicating, with the network node, an indication of one or more of the first number of resource elements, the first modulation coding scheme, the first number of data bits, or the first number of control bits.

In one aspect, method 1000 further includes receiving an indication of a first power ratio between energy harvesting and data reception, wherein at least one of the energy request report indicates a first charging parameter associated with the first power ratio between energy harvesting and data reception or the at least one communication capability comprises a first communication capability associated with the first power ratio between energy harvesting and data reception.

In one aspect, method 1000 further includes receiving an indication of a first time ratio between energy harvesting and data reception, wherein at least one of the energy request report indicates a second charging parameter associated with the first time ratio between energy harvesting and data reception or the at least one communication capability comprises a second communication capability associated with the first time ratio between energy harvesting and data reception.

In one aspect, at least one of the energy request report or the energy report comprises a table comprising a plurality of fields each having a predetermined size in bits, wherein values in each of the plurality of fields is quantized.

In one aspect, at least one of the energy request report or the energy report is sent using one of: a first interface associated with a higher power mode; or a second interface associated with a low power mode, wherein the first interface and the second interface are associated with the same or separate radios.

Figure 12:
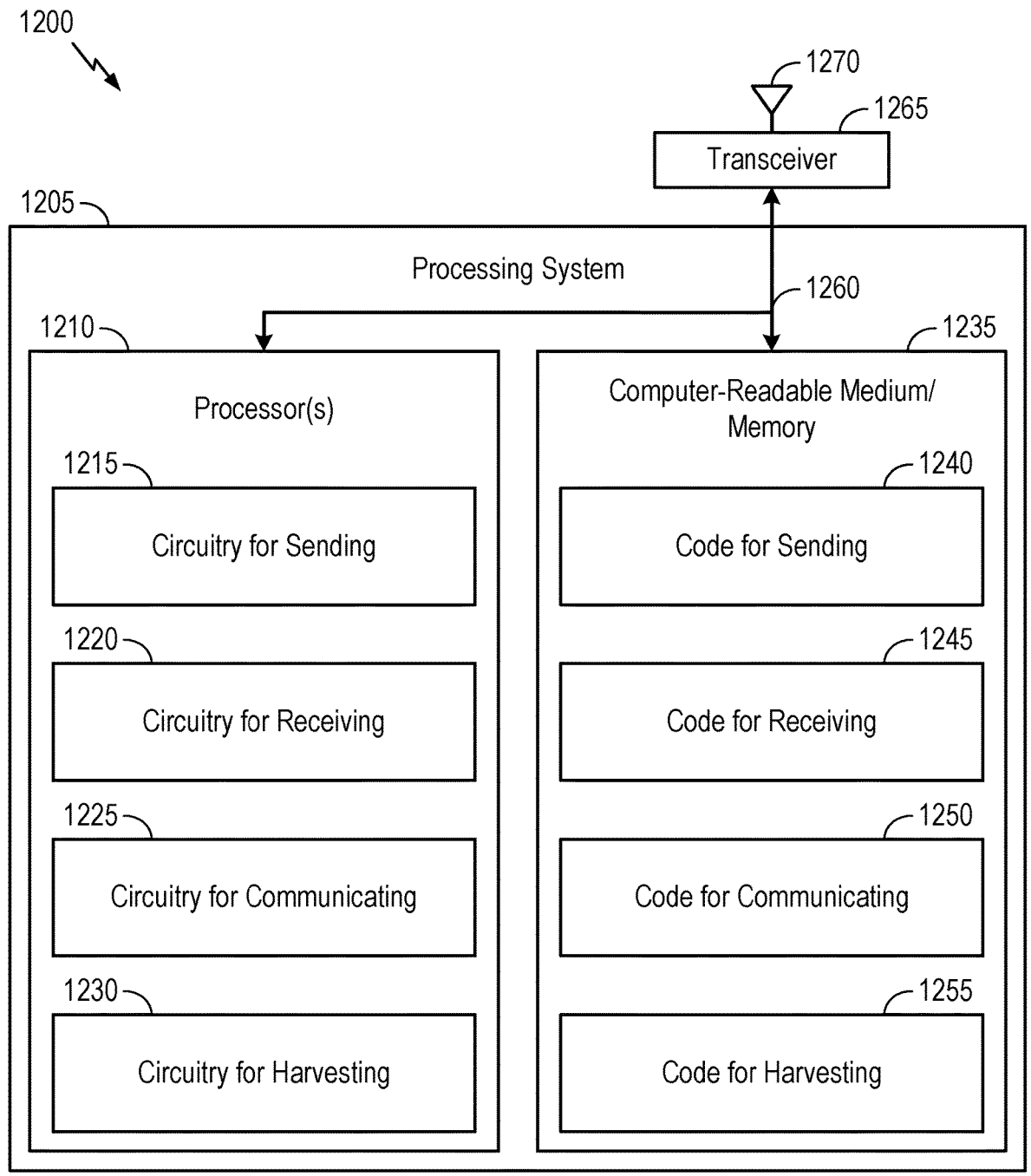
FIG. 12 depicts aspects of an example communications device.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

Example Operations of a Network Node

Figure 11:
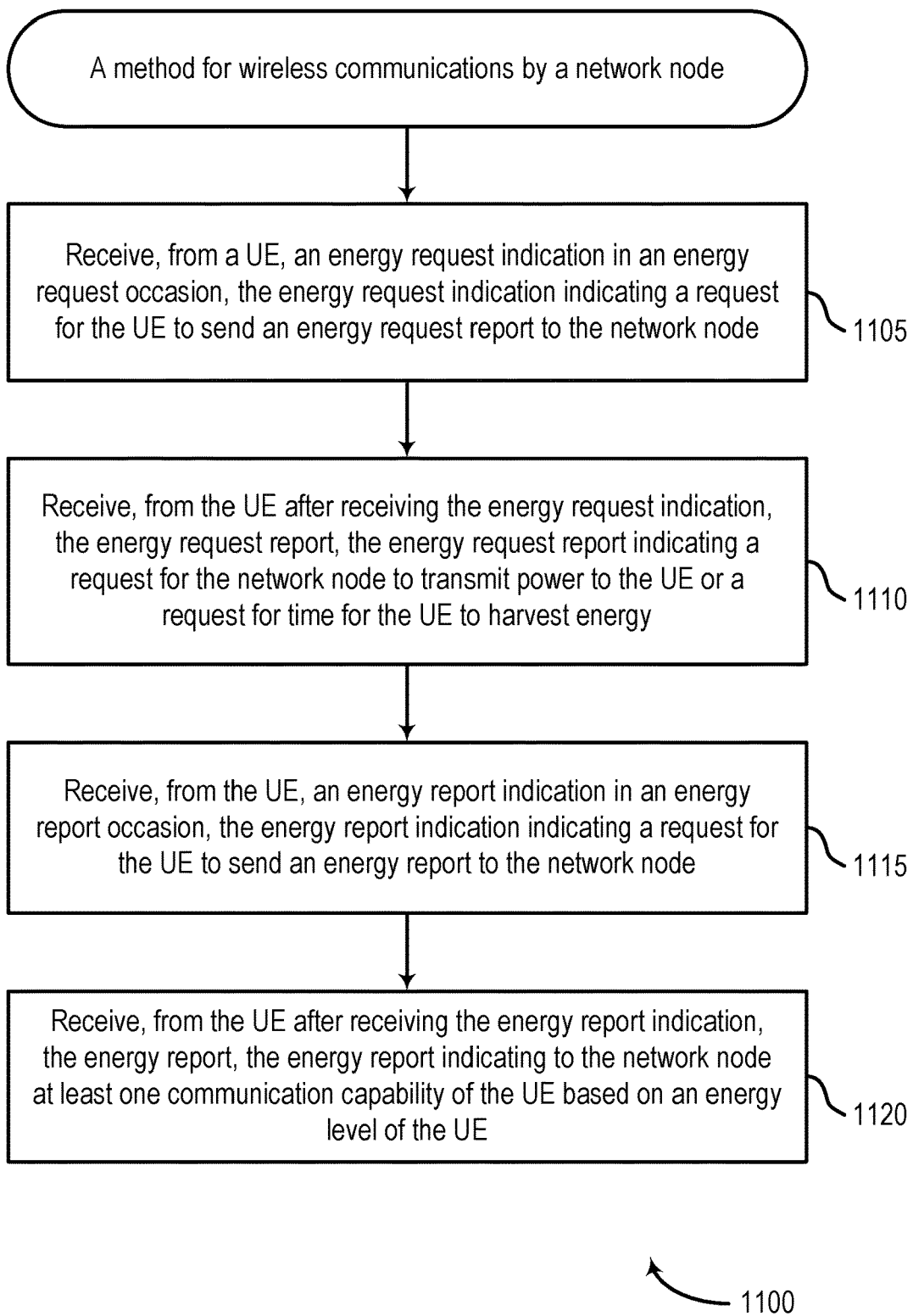
FIG. 11 depicts another method for wireless communications.

FIG. 11 shows a method 1100 for wireless communications by a network node, such as BS 102 of FIGS. 1 and 3, or a disaggregated base station as discussed with respect to FIG. 2.

Method 1100 begins at step 1105 with receiving, from a UE, an energy request indication in an energy request occasion, the energy request indication indicating a request for the UE to send an energy request report to the network node. For example, as discussed with respect to FIG. 8, BS 102 is configured to receive an energy request indication in an ERO 802a from EH UE 104. The energy request indication may be a request by the EH UE 104 to the BS 102 to use resources to send an energy request report to the BS 102. For example, when an EH UE 104 has insufficient power to perform one or more communication tasks, it may send an energy request indication in an ERO. For example, EH UE 104 may have a number of bits in an UL buffer of EH UE 104 to transmit, which may be divided among one or more TBs, and therefore may request energy to transmit the bits. In another example, BS 102 may indicate to EH UE 104 that BS 102 has a number of bits in a DL buffer of BS 102 to transmit to EH UE 104.

Method 1100 then proceeds to step 1110 with receiving, from the UE after receiving the energy request indication, the energy request report, the energy request report indicating a request for the network node to transmit power to the UE or a request for time for the UE to harvest energy. For example, as discussed with respect to FIG. 8, BS 102 is configured to receive an energy request report 804a from EH UE 104. In certain aspects, the energy request report indicates a request for BS 102 to transmit power to EH UE 104, such as by directing a laser beam or RF signals at EH UE 104. In certain aspects, the energy request report indicates a request for time for EH UE 104 to harvest energy.

Method 1100 then proceeds to step 1115 with receiving, from the UE, an energy report indication in an energy report occasion, the energy report indication indicating a request for the UE to send an energy report to the network node. For example, as discussed with respect to FIG. 9, BS 102 is configured to receive an energy report indication in an energy report occasion 902a from EH UE 104. The energy report indication may be a request by the EH UE 104 to the BS 102 to use resources to send an energy report to the BS 102. In certain aspects, EH UE 104 is configured to transmit the energy report indication in an energy report occasion when one or more conditions are met, as discussed further herein.

Method 1100 then proceeds to step 1120 with receiving, from the UE after receiving the energy report indication, the energy report, the energy report indicating to the network node at least one communication capability of the UE based on an energy level of the UE. For example, as discussed with respect to FIG. 9, BS 102 is configured to receive an energy report 904a from EH UE 104. In certain aspects, the energy report indicates, to the network node, at least one communication capability of the UE based on an energy level of the UE (e.g., a current energy level of the UE or a future predicted energy level of the UE). For example, the UE may have different communication capabilities for different energy levels.

In one aspect, method 1100 further includes receiving at least one of the energy request report or the energy report at least one of: multiplexed with a buffer status report; in a MAC-CE; in a physical uplink shared channel; in a physical uplink control channel; or multiplexed with another uplink resource.

In one aspect, the energy request report comprises one or more of: an indication for the network node to increase a power level of power transfer; an indication of a minimum charging rate for the UE; an indication of a first time period for harvesting energy for communicating according to a first slot format; an indication of a first charging rate for harvesting energy for communicating according to the first slot format; an indication of a first energy harvesting cycle configuration for harvesting energy for communicating according to the first slot format; an indication of a first number of energy units for communicating according to the first slot format; an indication of a second time period for harvesting energy for communicating according to a second slot format; an indication of a second charging rate for harvesting energy for communicating according to the second slot format; an indication of a second energy harvesting cycle configuration for harvesting energy for communicating according to the second slot format; an indication of a second number of energy units for communicating according to the second slot format; an indication of a third number of energy units for processing a first number of bits or transport blocks at least one of: communicated using a first number of resource elements, communicated with a first demodulation reference signal, communicated with a first modulation coding scheme, including a first number of data bits, or including a first number of control bits; an indication of a fourth number of energy units for processing a second number of bits or transport blocks at least one of: communicated using a second number of resource elements, communicated with a second demodulation reference signal, communicated with a second modulation coding scheme, including a second number of data bits, or including a second number of control bits; or an indication of a power level to use for communication.

In one aspect, method 1100 further includes sending, to the UE, an indication of a threshold charging rate, wherein the indication for the network node to increase the power level of power transfer indicates a power level associated with the threshold charging rate.

In one aspect, method 1100 further includes communicating, with the UE, an indication of at least one requested slot format for at least one of uplink, downlink, or sidelink communication, wherein the first slot format is based on the at least one requested slot format (e.g., is the at least one requested slot format).

In one aspect, method 1100 further includes communicating, with the UE, an indication of a plurality of energy harvesting cycle configurations, wherein the first energy harvesting cycle configuration is one of the plurality of energy harvesting cycle configurations.

In one aspect, method 1100 further includes communicating, with the UE, an indication of one or more of the first number of resource elements, the first modulation coding scheme, the first number of data bits, or the first number of control bits.

In one aspect, the energy request occasion is associated with a set of parameters comprising one or more of a slot format, a number of bits for communication, a transport block size for communication, or a number of energy units, and wherein information included in the energy request report is based on the set of parameters.

In one aspect, method 1100 further includes sending, to the UE, at least one of: an indication of a periodicity of energy request occasions; or an indication of a periodicity of energy report occasions.

In one aspect, method 1100 further includes sending, to the UE, at least one of: an indication of an updated periodicity of energy request occasions; or an indication of an updated periodicity of energy report occasions.

In one aspect, at least one of the updated periodicity of energy request occasions or the updated periodicity of energy report occasions is based on one or more of a charging rate of the UE, a discharging rate of the UE, or an energy state of the UE as indicated in the energy report.

In one aspect, method 1100 further includes receiving the energy request indication and the energy report indication at least one of: in different frequency resources within a same time resource; or in different time resources within a same frequency resource.

In one aspect, method 1100 further includes sending, before receiving the energy request report, an indication of an amount of data, wherein the energy request report indicates an amount of time to harvest energy to receive the amount of data.

In one aspect, method 1100 further includes receiving only one of a second energy request indication in a second energy request occasion or a second energy report indication in a second energy report occasion when the second energy request occasion overlaps with the second energy report occasion.

In one aspect, the at least one communication capability comprises one or more of: a first number of bits or transport blocks the UE can decode when one or more of communicated using a first number of resource elements, communicated with a first demodulation reference signal, communicated with a first modulation coding scheme, including a first number of data bits, or including a first number of control bits; a first number of control signals the UE can decode; a second number of bits or transport blocks the UE can communicate when one or more of communicated using a second number of resource elements, communicated with a second demodulation reference signal, communicated with a second modulation coding scheme, including a second number of data bits, or including a second number of control bits, and when using a first transmit power; a third number of bits or transport blocks the UE can communicate when one or more of communicated using the second number of resource elements, communicated with the second demodulation reference signal, communicated with the second modulation coding scheme, including the second number of data bits, or including the second number of control bits, and when using a second transmit power; a second number of control signals the UE can transmit using a third transmit power; a third number of control signals the UE can transmit using a fourth transmit power; or a number of communications the UE can handle for each of one or more slot formats.

In one aspect, the energy level of the UE comprises a current energy level of the UE or a future predicted energy level of the UE.

In one aspect, method 1100 further includes communicating, with the UE, an indication of at least one requested slot format for at least one of uplink, downlink, or sidelink communication, wherein the one or more slot formats are based on the at least one requested slot format (e.g., is the at least one requested slot format).

In one aspect, method 1100 further includes communicating, with the UE, an indication of one or more of the first number of resource elements, the first modulation coding scheme, the first number of data bits, or the first number of control bits.

In one aspect, method 1100 further includes sending an indication of a first power ratio between energy harvesting and data reception, wherein at least one of the energy request report indicates a first charging parameter associated with the first power ratio between energy harvesting and data reception or the at least one communication capability comprises a first communication capability associated with the first power ratio between energy harvesting and data reception.

In one aspect, method 1100 further includes sending an indication of a first time ratio between energy harvesting and data reception, wherein at least one of the energy request report indicates a second charging parameter associated with the first time ratio between energy harvesting and data reception or the at least one communication capability comprises a second communication capability associated with the first time ratio between energy harvesting and data reception.

In one aspect, at least one of the energy request report or the energy report comprises a table comprising a plurality of fields each having a predetermined size in bits, wherein values in each of the plurality of fields is quantized.

Figure 13:
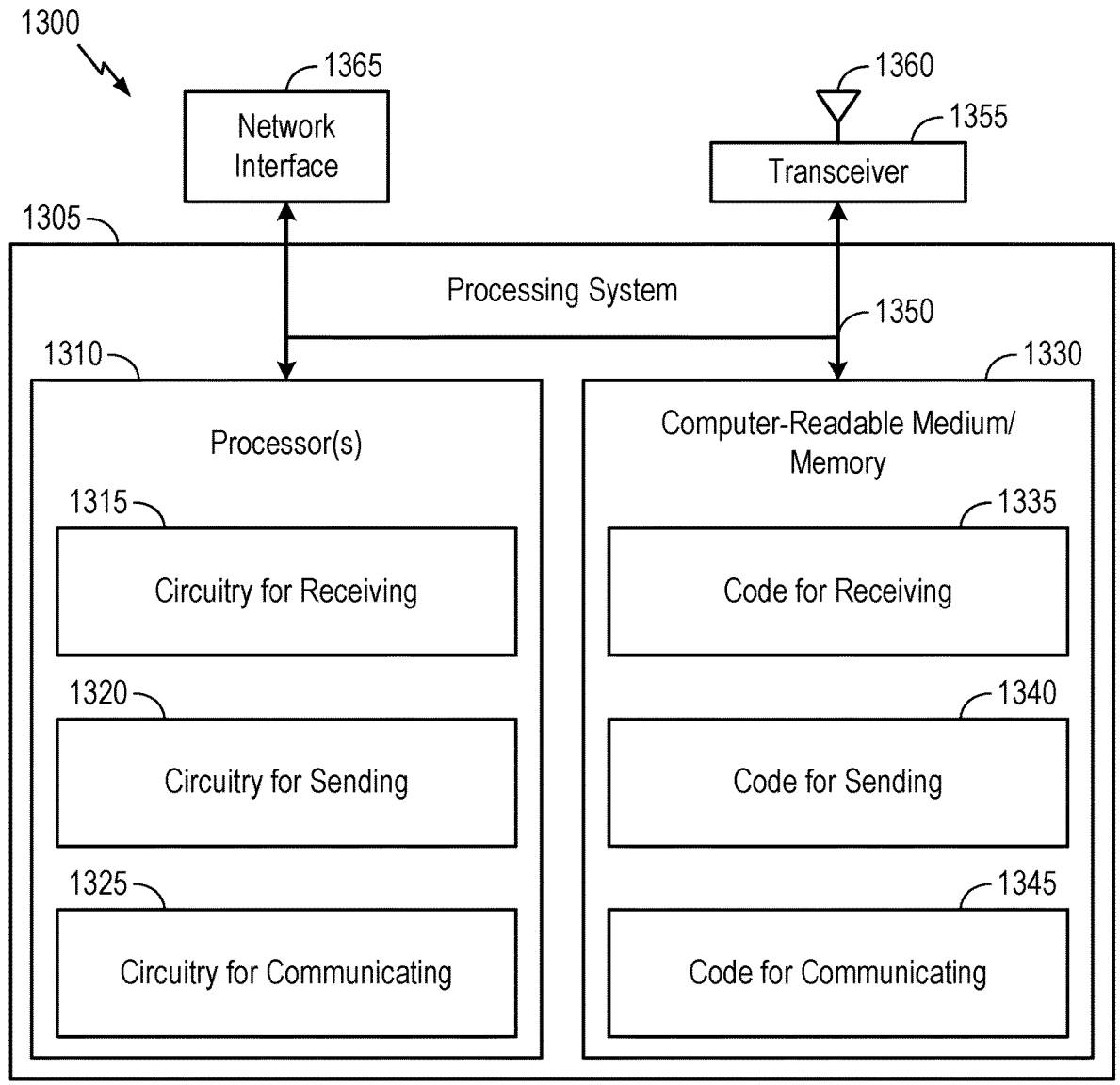
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a user equipment, such as UE 104 described above with respect to FIGS. 1 and 3.

The communications device 1200 includes a processing system 1205 coupled to a transceiver 1265 (e.g., a transmitter and/or a receiver). The transceiver 1265 is configured to transmit and receive signals for the communications device 1200 via an antenna 1270, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1235 via a bus 1260. In certain aspects, the computer-readable medium/memory 1235 is configured to store instructions (e.g., computer-executable code) that when executed by the one or more processors 1210, cause the one or more processors 1210 to perform the method 1000 described with respect to FIG. 10, or any aspect related to it, including any additional steps or sub-steps described in relation to FIG. 10. Note that reference to a processor performing a function of communications device 1200 may include one or more processors performing that function of communications device 1200.

In the depicted example, computer-readable medium/memory 1235 stores code (e.g., executable instructions) including code for sending 1240, code for receiving 1245, code for communicating 1250, and code for harvesting 1255. Processing of the code 1240-1255 may cause the communications device 1200 to perform the method 1000 described with respect to FIG. 10, or any aspect related to it.

The one or more processors 1210 include circuitry configured to implement (e.g., execute) the code stored in the computer-readable medium/memory 1235, including circuitry for sending 1215, circuitry for receiving 1220, circuitry for communicating 1225, and circuitry for harvesting 1230. Processing with circuitry 1215-1230 may cause the communications device 1200 to perform the method 1000 described with respect to FIG. 10, or any aspect related to it.

Various components of the communications device 1200 may provide means for performing the method 1000 described with respect to FIG. 10, or any aspect related to it. For example, means for communicating, transmitting, sending or outputting for transmission may include the transceivers 354, antenna(s) 352, transmit processor 364, TX MIMO processor 366, and/or controller/processor 380 of the UE 104 illustrated in FIG. 3, transceiver 1265 and antenna 1270 of the communications device 1200 in FIG. 12, and/or one or more processors 1210 of the communications device 1200 in FIG. 12. Means for communicating, receiving or obtaining may include the transceivers 354, antenna(s) 352, receive processor 358, and/or controller/processor 380 of the UE 104 illustrated in FIG. 3, transceiver 1265 and antenna 1270 of the communications device 1200 in FIG. 12, and/or one or more processors 1210 of the communications device 1200 in FIG. 12. Means for harvesting may include antenna (s) 352 of FIG. 3 and/or one or more of EH Circuit 555 and/or antenna(s) 552 of one or more of FIGS. 5A-5C.

FIG. 13 depicts aspects of an example communications device. In some aspects, communications device 1300 is a network entity, such as BS 102 of FIGS. 1 and 3, or a disaggregated base station as discussed with respect to FIG. 2.

The communications device 1300 includes a processing system 1305 coupled to a transceiver 1355 (e.g., a transmitter and/or a receiver) and/or a network interface 1365. The transceiver 1355 is configured to transmit and receive signals for the communications device 1300 via an antenna 1360, such as the various signals as described herein. The network interface 1365 is configured to obtain and send signals for the communications device 1300 via communications link(s), such as a backhaul link, midhaul link, and/or fronthaul link as described herein, such as with respect to FIG. 2. The processing system 1305 may be configured to perform processing functions for the communications device 1300, including processing signals received and/or to be transmitted by the communications device 1300.

The processing system 1305 includes one or more processors 1310. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1330 via a bus 1350. In certain aspects, the computer-readable medium/memory 1330 is configured to store instructions (e.g., computer-executable code) that when executed by the one or more processors 1310, cause the one or more processors 1310 to perform the method 1100 described with respect to FIG. 11, or any aspect related to it, including any additional steps or sub-steps described in relation to FIG. 11. Note that reference to a processor of communications device 1300 performing a function may include one or more processors of communications device 1300 performing that function.

In the depicted example, the computer-readable medium/memory 1330 stores code (e.g., executable instructions) including code for receiving 1335, code for sending 1340, and code for communicating 1345. Processing of the code 1335-1345 may cause the communications device 1300 to perform the method 1100 described with respect to FIG. 11, or any aspect related to it.

The one or more processors 1310 include circuitry configured to implement (e.g., execute) the code stored in the computer-readable medium/memory 1330, including circuitry for receiving 1315, circuitry for sending 1320, and circuitry for communicating 1325. Processing with circuitry 1315-1325 may cause the communications device 1300 to perform the method 1100 described with respect to FIG. 11, or any aspect related to it.

Various components of the communications device 1300 may provide means for performing the method 1100 described with respect to FIG. 11, or any aspect related to it. Means for communicating, transmitting, sending or outputting for transmission may include the transceivers 332, antenna(s) 334, transmit processor 320, TX MIMO processor 330, and/or controller/processor 340 of the BS 102 illustrated in FIG. 3, transceiver 1355 and antenna 1360 of the communications device 1300 in FIG. 13, and/or one or more processors 1310 of the communications device 1300 in FIG. 13. Means for communicating, receiving or obtaining may include the transceivers 332, antenna(s) 334, receive processor 338, and/or controller/processor 340 of the BS 102 illustrated in FIG. 3, transceiver 1355 and antenna 1360 of the communications device 1300 in FIG. 13, and/or one or more processors 1310 of the communications device 1300 in FIG. 13.

Example Clauses

Implementation examples are described in the following numbered clauses:

Clause 1: A method for wireless communications by a UE comprising: sending, to a network node, an energy request indication in an energy request occasion, the energy request indication indicating a request for the UE to send an energy request report to the network node; sending, to the network node after sending the energy request indication, the energy request report, the energy request report indicating a request for the network node to transmit power to the UE or a request for time for the UE to harvest energy; sending, to the network node, an energy report indication in an energy report occasion, the energy report indication indicating a request for the UE to send an energy report to the network node; and sending, to the network node after sending the energy report indication, the energy report, the energy report indicating to the network node at least one communication capability of the UE based on an energy level of the UE.

Clause 2: The method of Clause 1, wherein the UE sends the energy request indication based on one or more of: a current charging rate of the UE being below a first threshold charging rate; a predicted charging rate of the UE for a first future time period being below a second threshold charging rate; a current discharging rate of the UE being above a first threshold discharging rate; a predicted discharging rate of the UE for a second future time period being above a second threshold discharging rate; a current energy level of the UE; or a data arrival rate at the UE.

Clause 3: The method of any one of Clauses 1 and 2, further comprising: sending at least one of the energy request report or the energy report at least one of: multiplexed with a buffer status report; in a MAC-CE; in a physical uplink shared channel; in a physical uplink control channel; or multiplexed with another uplink resource.

Clause 4: The method of any one of Clauses 1-3, wherein the energy request report comprises one or more of: an indication for the network node to increase a power level of power transfer; an indication of a minimum charging rate for the UE; an indication of a first time period for harvesting energy for communicating according to a first slot format; an indication of a first charging rate for harvesting energy for communicating according to the first slot format; an indication of a first energy harvesting cycle configuration for harvesting energy for communicating according to the first slot format; an indication of a first number of energy units for communicating according to the first slot format; an indication of a second time period for harvesting energy for communicating according to a second slot format; an indication of a second charging rate for harvesting energy for communicating according to the second slot format; an indication of a second energy harvesting cycle configuration for harvesting energy for communicating according to the second slot format; an indication of a second number of energy units for communicating according to the second slot format; an indication of a third number of energy units for processing a first number of bits or transport blocks at least one of: communicated using a first number of resource elements, communicated with a first demodulation reference signal, communicated with a first modulation coding scheme, including a first number of data bits, or including a first number of control bits; an indication of a fourth number of energy units for processing a second number of bits or transport blocks at least one of: communicated using a second number of resource elements, communicated with a second demodulation reference signal, communicated with a second modulation coding scheme, including a second number of data bits, or including a second number of control bits; an indication of a cycle configuration to use for communication; or an indication of a power level to use for communication.

Clause 5: The method of Clause 4, further comprising: receiving, from the network node, an indication of a threshold charging rate, wherein the indication for the network node to increase the power level of power transfer indicates a power level associated with the threshold charging rate.

Clause 7: The method of Clause 4, further comprising at least one of: communicating, with the network node, an indication of at least one requested slot format for at least one of uplink, downlink, or sidelink communication, wherein the first slot format is based on the at least one requested slot format; communicating, with the network node, an indication of a plurality of energy harvesting cycle configurations, wherein the first energy harvesting cycle configuration is one of the plurality of energy harvesting cycle configurations; or communicating, with the network node, an indication of one or more of the first number of resource elements, the first modulation coding scheme, the first number of data bits, or the first number of control bits.

Clause 6: The method of any one of Clauses 1-5, wherein the energy request occasion is associated with a set of parameters comprising one or more of a slot format, a number of bits for communication, a transport block size for communication, or a number of energy units, and wherein information included in the energy request report is based on the set of parameters.

Clause 8: The method of any one of Clauses 1-7, further comprising: receiving, from the network node, at least one of: an indication of a periodicity of energy request occasions; or an indication of a periodicity of energy report occasions.

Clause 9: The method of Clause 8, further comprising: receiving, from the network node, at least one of: an indication of an updated periodicity of energy request occasions; or an indication of an updated periodicity of energy report occasions.

Clause 10: The method of Clause 9, wherein at least one of the updated periodicity of energy request occasions or the updated periodicity of energy report occasions is based on one or more of a charging rate of the UE, a discharging rate of the UE, or an energy state of the UE as indicated in the energy report.

Clause 11: The method of any one of Clauses 1-10, further comprising: communicating with the network node according to periodic discontinuous reception cycles, wherein each cycle of the periodic discontinuous reception cycles comprises an active time period where the UE is configured to monitor for signals and a sleep time period where the UE is not configured to monitor for the signals; and harvesting energy according to periodic energy harvesting cycles, wherein each cycle of the periodic energy harvesting cycles comprises a harvesting time period where the UE is configured to harvest energy and a non-harvesting time period where the UE is not configured to harvest energy.

Clause 12: The method of Clause 11, wherein the active time periods of the periodic discontinuous reception cycles overlap in time with the harvesting time periods of the periodic energy harvesting cycles.

Clause 13: The method of any one of Clauses 1-12, further comprising: sending the energy request indication and the energy report indication at least one of: in different frequency resources within a same time resource; or in different time resources within a same frequency resource.

Clause 14: The method of any one of Clauses 1-13, wherein the UE sends the energy report indication based on one or more of: a charging rate of the UE having changed by a first threshold from a previously reported charging rate; a discharging rate of the UE having changed by a second threshold from a previously reported discharging rate; a change in energy level of the UE by a threshold from a previously reported energy level; or a data arrival rate at the UE.

Clause 15: The method of any one of Clauses 1-14, further comprising: receiving, before sending the energy request report, an indication of an amount of data, wherein the energy request report indicates an amount of time to harvest energy to receive the amount of data.

Clause 16: The method of any one of Clauses 1-15, further comprising: sending only one of a second energy request indication in a second energy request occasion or a second energy report indication in a second energy report occasion when the second energy request occasion overlaps with the second energy report occasion.

Clause 17: The method of any one of Clauses 1-16, wherein the at least one communication capability comprises one or more of: a first number of bits or transport blocks the UE can decode when one or more of communicated using a first number of resource elements, communicated with a first demodulation reference signal, communicated with a first modulation coding scheme, including a first number of data bits, or including a first number of control bits; a first number of control signals the UE can decode; a second number of bits or transport blocks the UE can communicate when one or more of communicated using a second number of resource elements, communicated with a second demodulation reference signal, communicated with a second modulation coding scheme, including a second number of data bits, or including a second number of control bits, and when using a first transmit power; a third number of bits or transport blocks the UE can communicate when one or more of communicated using the second number of resource elements, communicated with the second demodulation reference signal, communicated with the second modulation coding scheme, including the second number of data bits, or including the second number of control bits, and when using a second transmit power; a second number of control signals the UE can transmit using a third transmit power; a third number of control signals the UE can transmit using a fourth transmit power; a number of communications the UE can handle for a cycle configuration for communication; or a number of communications the UE can handle for each of one or more slot formats.

Clause 18: The method of Clause 17, wherein the energy level of the UE comprises a current energy level of the UE or a future predicted energy level of the UE.

Clause 19: The method of Clause 17, further comprising at least one of: communicating, with the network node, an indication of at least one requested slot format for at least one of uplink, downlink, or sidelink communication, wherein the one or more slot formats are based on the at least one requested slot format; or communicating, with the network node, an indication of one or more of the first number of resource elements, the first modulation coding scheme, the first number of data bits, or the first number of control bits.

Clause 20: The method of any one of Clauses 1-19, further comprising at least one of: receiving an indication of a first power ratio between energy harvesting and data reception, wherein at least one of the energy request report indicates a first charging parameter associated with the first power ratio between energy harvesting and data reception or the at least one communication capability comprises a first communication capability associated with the first power ratio between energy harvesting and data reception; or receiving an indication of a first time ratio between energy harvesting and data reception, wherein at least one of the energy request report indicates a second charging parameter associated with the first time ratio between energy harvesting and data reception or the at least one communication capability comprises a second communication capability associated with the first time ratio between energy harvesting and data reception.

Clause 21: The method of any one of Clauses 1-20, wherein at least one of the energy request report or the energy report comprises a table comprising a plurality of fields each having a predetermined size in bits, wherein values in each of the plurality of fields is quantized.

Clause 22: The method of any one of Clauses 1-21, wherein at least one of the energy request report or the energy report is sent using one of: a first interface associated with a higher power mode; or a second interface associated with a low power mode, wherein the first interface and the second interface are associated with the same or separate radios.

Clause 23: A method for wireless communications by a network node comprising: receiving, from a UE, an energy request indication in an energy request occasion, the energy request indication indicating a request for the UE to send an energy request report to the network node; receiving, from the UE after receiving the energy request indication, the energy request report, the energy request report indicating a request for the network node to transmit power to the UE or a request for time for the UE to harvest energy; receiving, from the UE, an energy report indication in an energy report occasion, the energy report indication indicating a request for the UE to send an energy report to the network node; and receiving, from the UE after receiving the energy report indication, the energy report, the energy report indicating to the network node at least one communication capability of the UE based on an energy level of the UE.

Clause 24: The method of Clause 23, further comprising: receiving at least one of the energy request report or the energy report at least one of: multiplexed with a buffer status report; in a MAC-CE; in a physical uplink shared channel; in a physical uplink control channel; or multiplexed with another uplink resource.

Clause 25: The method of any one of Clauses 23 and 24, wherein the energy request report comprises one or more of: an indication for the network node to increase a power level of power transfer; an indication of a minimum charging rate for the UE; an indication of a first time period for harvesting energy for communicating according to a first slot format; an indication of a first charging rate for harvesting energy for communicating according to the first slot format; an indication of a first energy harvesting cycle configuration for harvesting energy for communicating according to the first slot format; an indication of a first number of energy units for communicating according to the first slot format; an indication of a second time period for harvesting energy for communicating according to a second slot format; an indication of a second charging rate for harvesting energy for communicating according to the second slot format; an indication of a second energy harvesting cycle configuration for harvesting energy for communicating according to the second slot format; an indication of a second number of energy units for communicating according to the second slot format; an indication of a third number of energy units for processing a first number of bits or transport blocks at least one of: communicated using a first number of resource elements, communicated with a first demodulation reference signal, communicated with a first modulation coding scheme, including a first number of data bits, or including a first number of control bits; an indication of a fourth number of energy units for processing a second number of bits or transport blocks at least one of: communicated using a second number of resource elements, communicated with a second demodulation reference signal, communicated with a second modulation coding scheme, including a second number of data bits, or including a second number of control bits; or an indication of a power level to use for communication.

Clause 26: The method of Clause 25, further comprising: sending, to the UE, an indication of a threshold charging rate, wherein the indication for the network node to increase the power level of power transfer indicates a power level associated with the threshold charging rate.

Clause 28: The method of Clause 25, further comprising at least one of: communicating, with the UE, an indication of at least one requested slot format for at least one of uplink, downlink, or sidelink communication, wherein the first slot format is based on the at least one requested slot format; communicating, with the UE, an indication of a plurality of energy harvesting cycle configurations, wherein the first energy harvesting cycle configuration is one of the plurality of energy harvesting cycle configurations; or communicating, with the UE, an indication of one or more of the first number of resource elements, the first modulation coding scheme, the first number of data bits, or the first number of control bits.

Clause 27: The method of any one of Clauses 23-26, wherein the energy request occasion is associated with a set of parameters comprising one or more of a slot format, a number of bits for communication, a transport block size for communication, or a number of energy units, and wherein information included in the energy request report is based on the set of parameters.

Clause 29: The method of any one of Clauses 23-28, further comprising: sending, to the UE, at least one of: an indication of a periodicity of energy request occasions; or an indication of a periodicity of energy report occasions.

Clause 30: The method of Clause 29, further comprising: sending, to the UE, at least one of: an indication of an updated periodicity of energy request occasions; or an indication of an updated periodicity of energy report occasions.

Clause 31: The method of Clause 30, wherein at least one of the updated periodicity of energy request occasions or the updated periodicity of energy report occasions is based on one or more of a charging rate of the UE, a discharging rate of the UE, or an energy state of the UE as indicated in the energy report.

Clause 32: The method of any one of Clauses 23-31, further comprising: receiving the energy request indication and the energy report indication at least one of: in different frequency resources within a same time resource; or in different time resources within a same frequency resource.

Clause 33: The method of any one of Clauses 23-32, further comprising: sending, before receiving the energy request report, an indication of an amount of data, wherein the energy request report indicates an amount of time to harvest energy to receive the amount of data.

Clause 34: The method of any one of Clauses 23-33, further comprising: receiving only one of a second energy request indication in a second energy request occasion or a second energy report indication in a second energy report occasion when the second energy request occasion overlaps with the second energy report occasion.

Clause 35: The method of any one of Clauses 23-34, wherein the at least one communication capability comprises one or more of: a first number of bits or transport blocks the UE can decode when one or more of communicated using a first number of resource elements, communicated with a first demodulation reference signal, communicated with a first modulation coding scheme, including a first number of data bits, or including a first number of control bits; a first number of control signals the UE can decode; a second number of bits or transport blocks the UE can communicate when one or more of communicated using a second number of resource elements, communicated with a second demodulation reference signal, communicated with a second modulation coding scheme, including a second number of data bits, or including a second number of control bits, and when using a first transmit power; a third number of bits or transport blocks the UE can communicate when one or more of communicated using the second number of resource elements, communicated with the second demodulation reference signal, communicated with the second modulation coding scheme, including the second number of data bits, or including the second number of control bits, and when using a second transmit power; a second number of control signals the UE can transmit using a third transmit power; a third number of control signals the UE can transmit using a fourth transmit power; or a number of communications the UE can handle for each of one or more slot formats.

Clause 36: The method of Clause 35, wherein the energy level of the UE comprises a current energy level of the UE or a future predicted energy level of the UE.

Clause 37: The method of Clause 35, further comprising at least one of: communicating, with the UE, an indication of at least one requested slot format for at least one of uplink, downlink, or sidelink communication, wherein the one or more slot formats are based on the at least one requested slot format; or communicating, with the UE, an indication of one or more of the first number of resource elements, the first modulation coding scheme, the first number of data bits, or the first number of control bits.

Clause 38: The method of any one of Clauses 23-37, further comprising at least one of: sending an indication of a first power ratio between energy harvesting and data reception, wherein at least one of the energy request report indicates a first charging parameter associated with the first power ratio between energy harvesting and data reception or the at least one communication capability comprises a first communication capability associated with the first power ratio between energy harvesting and data reception; or sending an indication of a first time ratio between energy harvesting and data reception, wherein at least one of the energy request report indicates a second charging parameter associated with the first time ratio between energy harvesting and data reception or the at least one communication capability comprises a second communication capability associated with the first time ratio between energy harvesting and data reception.

Clause 39: The method of any one of Clauses 23-38, wherein at least one of the energy request report or the energy report comprises a table comprising a plurality of fields each having a predetermined size in bits, wherein values in each of the plurality of fields is quantized.

Clause 40: An apparatus, comprising: a memory comprising executable instructions; and a processor configured to execute the executable instructions and cause the apparatus to perform a method in accordance with any one of Clauses 1-39.

Clause 41: An apparatus, comprising means for performing a method in accordance with any one of Clauses 1-39.

Clause 42: A non-transitory computer-readable medium comprising executable instructions that, when executed by a processor of an apparatus, cause the apparatus to perform a method in accordance with any one of Clauses 1-39.

Clause 43: A computer program product embodied on a computer-readable storage medium comprising code for performing a method in accordance with any one of Clauses 1-39.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "coupled to" included both directly coupling of components, e.g., X is directly coupled to Y, and coupling via an intermediary component, e.g., X is coupled to Y, Y is coupled to Z and therefore X is coupled to Z via Y. In an example, X is a processor, Y is a bus, and Z is memory.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) comprising:
   memory; and
   one or more processors coupled to the memory, the memory and the one or more processors configured to:
   send, to a network node, an energy request indication in an energy request occasion, the energy request indication indicating a request for the UE to send an energy request report to the network node;
   after sending the energy request indication, send, to the network node, the energy request report, the energy request report indicating a request for the network node to transmit power to the UE or a request for time for the UE to harvest energy;

send, to the network node, an energy report indication in an energy report occasion, the energy report indication indicating a request for the UE to send an energy report to the network node; and after sending the energy report indication, send, to the network node, the energy report, the energy report indicating to the network node at least one communication capability of the UE based on an energy level of the UE.

2. The UE of claim 1, wherein the memory and the one or more processors are further configured to:
send at least one of the energy request report or the energy report at least one of:
multiplexed with a buffer status report;
in a medium access control (MAC) control element (CE);
in a physical uplink shared channel;
in a physical uplink control channel; or
multiplexed with another uplink resource.

3. The UE of claim 1, wherein the energy request report comprises one or more of:
an indication for the network node to increase a power level of power transfer;
an indication of a minimum charging rate for the UE;
an indication of a first time period for harvesting energy for communicating according to a first slot format;
an indication of a first charging rate for harvesting energy for communicating according to the first slot format;
an indication of a first energy harvesting cycle configuration for harvesting energy for communicating according to the first slot format;
an indication of a first number of energy units for communicating according to the first slot format;
an indication of a second time period for harvesting energy for communicating according to a second slot format;
an indication of a second charging rate for harvesting energy for communicating according to the second slot format;
an indication of a second energy harvesting cycle configuration for harvesting energy for communicating according to the second slot format;
an indication of a second number of energy units for communicating according to the second slot format;
an indication of a third number of energy units for processing a first number of bits or transport blocks at least one of: communicated using a first number of resource elements, communicated with a first demodulation reference signal, communicated with a first modulation coding scheme, including a first number of data bits, or including a first number of control bits;
an indication of a fourth number of energy units for processing a second number of bits or transport blocks at least one of: communicated using a second number of resource elements, communicated with a second demodulation reference signal, communicated with a second modulation coding scheme, including a second number of data bits, or including a second number of control bits;
an indication of a cycle configuration to use for communication; or
an indication of a power level to use for communication.

4. The UE of claim 1, wherein the energy request occasion is associated with a set of parameters comprising one or more of a slot format, a number of bits for communication, a transport block size for communication, or a number of energy units, and wherein information included in the energy request report is based on the set of parameters.

5. The UE of claim 1, wherein the memory and the one or more processors are further configured to:
receive, from the network node, at least one of:
an indication of a periodicity of energy request occasions; or
an indication of a periodicity of energy report occasions.

6. The UE of claim 5, wherein the memory and the one or more processors are further configured to:
receive, from the network node, at least one of:
an indication of an updated periodicity of energy request occasions; or
an indication of an updated periodicity of energy report occasions.

7. The UE of claim 1, wherein the memory and the one or more processors are further configured to:
communicate with the network node according to periodic discontinuous reception cycles, wherein each cycle of the periodic discontinuous reception cycles comprises an active time period where the UE is configured to monitor for signals and a sleep time period where the UE is not configured to monitor for the signals; and
harvest energy according to periodic energy harvesting cycles, wherein each cycle of the periodic energy harvesting cycles comprises a harvesting time period where the UE is configured to harvest energy and a non-harvesting time period where the UE is not configured to harvest energy.

8. The UE of claim 1, wherein the memory and the one or more processors are further configured to:
send the energy request indication and the energy report indication at least one of:
in different frequency resources within a same time resource; or
in different time resources within a same frequency resource.

9. The UE of claim 1, wherein the memory and the one or more processors are further configured to:
receive, before sending the energy request report, an indication of an amount of data, wherein the energy request report indicates an amount of time to harvest energy to receive the amount of data.

10. The UE of claim 1, wherein the memory and the one or more processors are further configured to:
send only one of a second energy request indication in a second energy request occasion or a second energy report indication in a second energy report occasion when the second energy request occasion overlaps with the second energy report occasion.

11. The UE of claim 1, wherein the at least one communication capability comprises one or more of:
a first number of bits or transport blocks the UE can decode when one or more of communicated using a first number of resource elements, communicated with a first demodulation reference signal, communicated with a first modulation coding scheme, including a first number of data bits, or including a first number of control bits;
a first number of control signals the UE can decode;
a second number of bits or transport blocks the UE can communicate when one or more of communicated using a second number of resource elements, communicated with a second demodulation reference signal, communicated with a second modulation coding scheme, including a second number of data bits, or including a second number of control bits, and when using a first transmit power;
a third number of bits or transport blocks the UE can communicate when one or more of communicated using the second number of resource elements, communicated with the second demodulation reference signal, communicated with the second modulation coding scheme, including the second number of data bits, or including the second number of control bits, and when using a second transmit power;
a second number of control signals the UE can transmit using a third transmit power;
a third number of control signals the UE can transmit using a fourth transmit power;
a number of communications the UE can handle for a cycle configuration for communication; or
a number of communications the UE can handle for each of one or more slot formats.

12. The UE of claim 11, wherein the energy level of the UE comprises a current energy level of the UE or a future predicted energy level of the UE.

13. The UE of claim 1, wherein the memory and the one or more processors are further configured to at least one of:
receive an indication of a first power ratio between energy harvesting and data reception, wherein at least one of the energy request report indicates a first charging parameter associated with the first power ratio between energy harvesting and data reception or the at least one communication capability comprises a first communication capability associated with the first power ratio between energy harvesting and data reception; or
receive an indication of a first time ratio between energy harvesting and data reception, wherein at least one of the energy request report indicates a second charging parameter associated with the first time ratio between energy harvesting and data reception or the at least one communication capability comprises a second communication capability associated with the first time ratio between energy harvesting and data reception.

14. A network node comprising:
memory; and
one or more processors coupled to the memory, the memory and the one or more processors configured to:
receive, from a user equipment (UE), an energy request indication in an energy request occasion, the energy request indication indicating a request for the UE to send an energy request report to the network node;
after receiving the energy request indication, receive, from the UE, the energy request report, the energy request report indicating a request for the network node to transmit power to the UE or a request for time for the UE to harvest energy;
receive, from the UE, an energy report indication in an energy report occasion, the energy report indication indicating a request for the UE to send an energy report to the network node; and
after receiving the energy report indication, receive, from the UE, the energy report, the energy report indicating to the network node at least one communication capability of the UE based on an energy level of the UE.

15. The network node of claim 14, wherein the memory and the one or more processors are further configured to:
receive at least one of the energy request report or the energy report at least one of:
multiplexed with a buffer status report;
in a medium access control (MAC) control element (CE);
in a physical uplink shared channel;
in a physical uplink control channel; or
multiplexed with another uplink resource.

16. The network node of claim 14, wherein the energy request report comprises one or more of:
an indication for the network node to increase a power level of power transfer;
an indication of a minimum charging rate for the UE;
an indication of a first time period for harvesting energy for communicating according to a first slot format;
an indication of a first charging rate for harvesting energy for communicating according to the first slot format;
an indication of a first energy harvesting cycle configuration for harvesting energy for communicating according to the first slot format;
an indication of a first number of energy units for communicating according to the first slot format;
an indication of a second time period for harvesting energy for communicating according to a second slot format;
an indication of a second charging rate for harvesting energy for communicating according to the second slot format;
an indication of a second energy harvesting cycle configuration for harvesting energy for communicating according to the second slot format;
an indication of a second number of energy units for communicating according to the second slot format;
an indication of a third number of energy units for processing a first number of bits or transport blocks at least one of: communicated using a first number of resource elements, communicated with a first demodulation reference signal, communicated with a first modulation coding scheme, including a first number of data bits, or including a first number of control bits;
an indication of a fourth number of energy units for processing a second number of bits or transport blocks at least one of: communicated using a second number of resource elements, communicated with a second demodulation reference signal, communicated with a second modulation coding scheme, including a second number of data bits, or including a second number of control bits; or
an indication of a power level to use for communication.

17. The network node of claim 14, wherein the energy request occasion is associated with a set of parameters comprising one or more of a slot format, a number of bits for communication, a transport block size for communication, or a number of energy units, and wherein information included in the energy request report is based on the set of parameters.

18. The network node of claim 14, wherein the memory and the one or more processors are further configured to:
send, to the UE, at least one of:
an indication of a periodicity of energy request occasions; or
an indication of a periodicity of energy report occasions.

19. The network node of claim 18, wherein the memory and the one or more processors are further configured to:
send, to the UE, at least one of:
an indication of an updated periodicity of energy request occasions; or an indication of an updated periodicity of energy report occasions.

20. The network node of claim 14, wherein the memory and the one or more processors are further configured to:
receive the energy request indication and the energy report indication at least one of:
in different frequency resources within a same time resource; or
in different time resources within a same frequency resource.

21. The network node of claim 14, wherein the memory and the one or more processors are further configured to:
send, before receiving the energy request report, an indication of an amount of data, wherein the energy request report indicates an amount of time to harvest energy to receive the amount of data.

22. The network node of claim 14, wherein the memory and the one or more processors are further configured to:
receive only one of a second energy request indication in a second energy request occasion or a second energy report indication in a second energy report occasion when the second energy request occasion overlaps with the second energy report occasion.

23. The network node of claim 14, wherein the at least one communication capability comprises one or more of:
a first number of bits or transport blocks the UE can decode when one or more of communicated using a first number of resource elements, communicated with a first demodulation reference signal, communicated with a first modulation coding scheme, including a first number of data bits, or including a first number of control bits;
a first number of control signals the UE can decode;
a second number of bits or transport blocks the UE can communicate when one or more of communicated using a second number of resource elements, communicated with a second demodulation reference signal, communicated with a second modulation coding scheme, including a second number of data bits, or including a second number of control bits, and when using a first transmit power;
a third number of bits or transport blocks the UE can communicate when one or more of communicated using the second number of resource elements, communicated with the second demodulation reference signal, communicated with the second modulation coding scheme, including the second number of data bits, or including the second number of control bits, and when using a second transmit power;
a second number of control signals the UE can transmit using a third transmit power;
a third number of control signals the UE can transmit using a fourth transmit power; or
a number of communications the UE can handle for each of one or more slot formats.

24. The network node of claim 23, wherein the energy level of the UE comprises a current energy level of the UE or a future predicted energy level of the UE.

25. The network node of claim 23, wherein the memory and the one or more processors are further configured to at least one of:
communicate, with the UE, an indication of at least one requested slot format for at least one of uplink, downlink, or sidelink communication, wherein the one or more slot formats are based on the at least one requested slot format; or
communicate, with the UE, an indication of one or more of the first number of resource elements, the first modulation coding scheme, the first number of data bits, or the first number of control bits.

26. The network node of claim 14, wherein the memory and the one or more processors are further configured to at least one of:
send an indication of a first power ratio between energy harvesting and data reception, wherein at least one of the energy request report indicates a first charging parameter associated with the first power ratio between energy harvesting and data reception or the at least one communication capability comprises a first communication capability associated with the first power ratio between energy harvesting and data reception; or
send an indication of a first time ratio between energy harvesting and data reception, wherein at least one of the energy request report indicates a second charging parameter associated with the first time ratio between energy harvesting and data reception or the at least one communication capability comprises a second communication capability associated with the first time ratio between energy harvesting and data reception.

27. A method of wireless communications by a user equipment (UE), the method comprising:
sending, to a network node, an energy request indication in an energy request occasion, the energy request indication indicating a request for the UE to send an energy request report to the network node;
after sending the energy request indication, sending, to the network node, the energy request report, the energy request report indicating a request for the network node to transmit power to the UE or a request for time for the UE to harvest energy;
sending, to the network node, an energy report indication in an energy report occasion, the energy report indication indicating a request for the UE to send an energy report to the network node; and
after sending the energy report indication, sending, to the network node, the energy report, the energy report indicating to the network node at least one communication capability of the UE based on an energy level of the UE.

28. The method of claim 27, further comprising:
sending at least one of the energy request report or the energy report at least one of:
multiplexed with a buffer status report;
in a medium access control (MAC) control element (CE);
in a physical uplink shared channel;
in a physical uplink control channel; or
multiplexed with another uplink resource.

29. A method of wireless communications by a network node, the method comprising:
receiving, from a user equipment (UE), an energy request indication in an energy request occasion, the energy request indication indicating a request for the UE to send an energy request report to the network node;
after receiving the energy request indication, receiving, from the UE, the energy request report, the energy request report indicating a request for the network node to transmit power to the UE or a request for time for the UE to harvest energy;
receiving, from the UE, an energy report indication in an energy report occasion, the energy report indication indicating a request for the UE to send an energy report to the network node; and after receiving the energy report indication, receiving, from the UE, the energy report, the energy report indicating to the network node at least one communication capability of the UE based on an energy level of the UE.

30. The method of claim 29, further comprising:
receiving at least one of the energy request report or the energy report at least one of:
- multiplexed with a buffer status report;
- in a medium access control (MAC) control element (CE);
- in a physical uplink shared channel;
- in a physical uplink control channel; or
- multiplexed with another uplink resource.

* * * * *